United States Patent
Lin et al.

(10) Patent No.: US 11,737,090 B2
(45) Date of Patent: Aug. 22, 2023

(54) TERMINAL APPARATUS, BASE STATION APPARATUS, AND COMMUNICATION METHOD

(71) Applicant: Sharp Kabushiki Kaisha, Sakai (JP)

(72) Inventors: Huifa Lin, Sakai (JP); Shoichi Suzuki, Sakai (JP); Daiichiro Nakashima, Sakai (JP); Toshizo Nogami, Sakai (JP); Wataru Ouchi, Sakai (JP); Tomoki Yoshimura, Sakai (JP); Taewoo Lee, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/788,323

(22) PCT Filed: Dec. 23, 2020

(86) PCT No.: PCT/JP2020/048264
§ 371 (c)(1),
(2) Date: Jun. 23, 2022

(87) PCT Pub. No.: WO2021/132385
PCT Pub. Date: Jul. 1, 2021

(65) Prior Publication Data
US 2023/0031134 A1  Feb. 2, 2023

(30) Foreign Application Priority Data

Dec. 25, 2019 (JP) ................................. 2019-234938

(51) Int. Cl.
*H04W 72/1273* (2023.01)
*H04W 72/23* (2023.01)
(Continued)

(52) U.S. Cl.
CPC ....... *H04W 72/1273* (2013.01); *H04L 1/1812* (2013.01); *H04W 24/08* (2013.01); *H04W 72/23* (2023.01)

(58) Field of Classification Search
CPC . H04W 24/08; H04W 72/23; H04W 72/1273; H04L 1/1812
(Continued)

(56) References Cited

U.S. PATENT DOCUMENTS

2021/0105102 A1* 4/2021 Li .......................... H04L 1/1896

FOREIGN PATENT DOCUMENTS

WO   WO-2021035437 A1 * 3/2021 ............... H04L 1/08

OTHER PUBLICATIONS

NTT DOCOMO, "New SID Proposal: Study on New Radio Access Technology", RP-160671, 3GPP TSG RAN Meeting #71, Mar. 7-10, 2016, 8 pages.
(Continued)

*Primary Examiner* — Peter G Solinsky
(74) *Attorney, Agent, or Firm* — Keating & Bennett, LLP

(57) ABSTRACT

A terminal apparatus includes: a reception unit configured to receive indication of a first PDSCH group index in a first DCI format, and receive indication of a second PDSCH group index in a second DCI format; and a transmission unit configured to, in a case that the first DCI format is detected, transmit HARQ-ACK information of the second PDSCH group index, the HARQ-ACK information being determined based at least on a parameter M. A value of a first NFI of the second PDSCH group index is indicated by a first NFI field in the second DCI format. A value of a second NFI of the second PDSCH group index is indicated by a second NFI field in the first DCI format. In a case that the value of the
(Continued)

In case that the second DAI field bitwidth is 6 and *NFI-TotalDAI-Included-r16* = *enable*:

In case that the second DAI field bitwidth is 4 and only one serving cell are configured in the DL and *NFI-TotalDAI-Included-r16* = *enable*:

second NFI is not null and the value of the second NFI is different from the value of the first NFI, a value of the parameter M is set to zero.

3 Claims, 16 Drawing Sheets

(51) Int. Cl.
*H04L 1/1812* (2023.01)
*H04W 24/08* (2009.01)

(58) Field of Classification Search
USPC .......................................................... 370/329
See application file for complete search history.

(56) References Cited

OTHER PUBLICATIONS

Samsung, "Introduction of shared spectrum channel access", 3GPP TSG-RAN WG1 Meeting #99, R1-1913632, Nov. 18-22, 2019, 45 pages.
3rd Generation Partnership Project; Technical Specification Group Radio Access Network; NR; Physical layer procedures for control (Release 15), 3GPP TS 38.213 V15.7.0, Sep. 2019, 9 pages.
MediaTek Inc., "Enhancements to HARQ and scheduling for NR-U operation", 3GPP TSG RAN WG1 #99, R1-1912090, Nov. 18-22, 2019, 9 pages.

\* cited by examiner

Figure A: Number of OFDM symbols per slot, slots per frame, and slots per subframe for normal cyclic prefix.

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure B: Number of OFDM symbols per slot, slots per frame, and slots per subframe for extended cyclic prefix.

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2

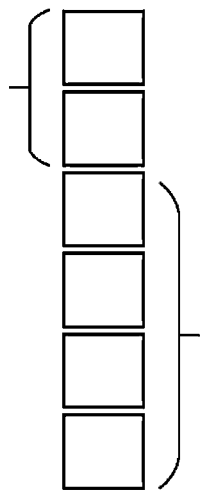
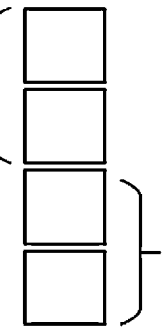
FIG. 11

<A1> Set $m=0$ – PDCCH with DCI format 1_0 or DCI format 1_1 monitoring occasion index: lower index corresponds to earlier PDCCH with DCI format 1_0 or DCI format 1_1 monitoring occasion <A2> Set $j=0$ <A3> Set $V_{temp}=0$ <A4> Set $V_{temp2}=0$ <A5> Set $V_s=\emptyset$ <A6> Set $N_{cells}^{DL}$ to the number of serving cells configured by higher layers for the UE <A7> Set $M$ to the number of PDCCH monitoring occasion(s)

<A8> while $m<M$

<A9> Set $c=0$ – serving cell index: lower indexes correspond to lower RRC indexes of corresponding cell <A10> while $c<N_{cells}^{DL}$ <A11> if PDCCH monitoring occasion $m$ is before an active DL BWP change on serving cell $c$ or an active UL BWP change on the PCell and an active DL BWP change is not triggered by a DCI format 1_1 in PDCCH monitoring occasion $m$ <A12> $c=c+1$;

<A13> else

<A14> if there is a PDSCH on serving cell $c$ associated with PDCCH in PDCCH monitoring occasion $m$, or there is a PDCCH indicating SPS PDSCH release on serving cell $c$ <A15> if $V_{C-DAI,c,m}^{DL} \leq V_{temp}$ <A16> $j=j+1$ <A17> end if <A18> $V_{temp}=V_{C-DAI,c,m}^{DL}$ <A19> if $V_{T-DAI,m}^{DL}=\emptyset$ <A20> $V_{temp2}=V_{C-DAI,c,m}^{DL}$ <A21> else

FIG. 12

<A22>    $V_{temp2} = V^{DL}_{T\text{-}DAI,m}$

<A23>    end if

<A24>    if *harq-ACK-SpatialBundlingPUCCH* is not provided and $m$ is a monitoring occasion for PDCCH with DCI format 1_0 or DCI format 1_1 and the UE is configured by *maxNrofCodeWordsScheduledByDCI* with reception of two transport blocks for at least one configured DL BWP of at least one serving cell, <A25>    $\tilde{o}^{ACK}_{8j+2(V^{DL}_{C\text{-}DAI,c,m}-1)}$ = HARQ-ACK information bit corresponding to the first transport block of this cell <A26>    $\tilde{o}^{ACK}_{8j+2(V^{DL}_{C\text{-}DAI,c,m}-1)+1}$ = HARQ-ACK information bit corresponding to the second transport block of this cell <A27>    $V_s = V_s \cup \{8j + 2(V^{DL}_{C\text{-}DAI,c,m} - 1), 8j + 2(V^{DL}_{C\text{-}DAI,c,m} - 1) + 1\}$ <A28>    elseif *harq-ACK-SpatialBundlingPUCCH* is provided to the UE and $m$ is a monitoring occasion for PDCCH with DCI format 1_1 and the UE is configured by *maxNrofCodeWordsScheduledByDCI* with reception of two transport blocks in at least one configured DL BWP of a serving cell, <A29>    $\tilde{o}^{ACK}_{4j+V^{DL}_{C\text{-}DAI,c,m}-1}$ = binary AND operation of the HARQ-ACK information bits corresponding to the first and second transport blocks of this cell <A30>    $V_s = V_s \cup \{4j + V^{DL}_{C\text{-}DAI,c,m} - 1\}$ <A31>    else <A32>    $\tilde{o}^{ACK}_{4j+V^{DL}_{C\text{-}DAI,c,m}-1}$ = HARQ-ACK information bit of this cell <A33>    $V_s = V_s \cup \{4j + V^{DL}_{C\text{-}DAI,c,m} - 1\}$ <A34>    end if
<A35>    end if
<A36>    $c = c + 1$
<A37>    end if
<A38>    end while

FIG. 13

<A39>     $m = m+1$
<A40>   end while
<A41>   if $V_{temp2} < V_{temp}$
   <A42>     $j = j+1$
<A43>   end if
<A44>   if *harq-ACK-SpatialBundlingPUCCH* is not provided to the UE and the UE is configured by *maxNrofCodeWordsScheduledByDCI* with reception of two transport blocks for at least one configured DL BWP of a serving cell,
   <A45>     $O^{ACK} = 2 \cdot (4 \cdot j + V_{temp2})$
<A46>   else
   <A47>     $O^{ACK} = 4 \cdot j + V_{temp2}$
<A48>   end if
<A49>   $\tilde{o}_i^{ACK} = \text{NACK}$ for any $i \in \{0,1,\ldots,O^{ACK}-1\} \setminus V_s$
<A50>   Set $c = 0$
<A51>   while $c < N_{cells}^{DL}$
   <A52>     if SPS PDSCH reception is activated for a UE and the UE is configured to receive SPS PDSCH in a slot $n - K_{1,c}$ for serving cell $c$, where $K_{1,c}$ is the PDSCH-to-HARQ-feedback timing value for SPS PDSCH on serving cell $c$
      <A53>     $O^{ACK} = O^{ACK} + 1$
      <A54>     $o_{O^{ACK}-1}^{ACK}$ = HARQ-ACK information bit associated with the SPS PDSCH reception
   <A55>    end if
   <A56>    $c = c+1$;
<A57>   end while

FIG. 14

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority to JP 2019-234938 filed on Dec. 25, 2019, the contents of which are incorporated herein by reference.

BACKGROUND ART

In the $3^{rd}$ Generation Partnership Project (3GPP), a radio access method and a radio network for cellular mobile communications (hereinafter referred to as "Long Term Evolution (LTE)" or "Evolved Universal Terrestrial Radio Access (EUTRA)") have been studied. In LTE, a base station apparatus is also referred to as an evolved NodeB (eNodeB), and a terminal apparatus is also referred to as User Equipment (UE). LTE is a cellular communication system in which multiple areas covered by base station apparatuses are deployed in a cell structure. A single base station apparatus may manage multiple serving cells.

3GPP has been studying a next generation standard (New Radio or NR) (NPL 1) to make a proposal for International Mobile Telecommunication (IMT)-2020, a standard for a next generation mobile communication system developed by the International Telecommunication Union (ITU). NR is required to satisfy requirements for three scenarios including enhanced Mobile BroadBand (eMBB), massive Machine Type Communication (mMTC), and Ultra Reliable and Low Latency Communication (URLLC) in a single technology framework.

CITATION LIST

Non Patent Literature

NPL 1: "New SID proposal: Study on New Radio Access Technology", RP-160671, NTT docomo, 3GPP TSG RAN Meeting #71, Goteborg, Sweden, 7 to 10 Mar. 2016.

SUMMARY OF INVENTION

Technical Problem

One aspect of the present invention provides a terminal apparatus that efficiently performs communication, a communication method used for the terminal apparatus, a base station apparatus that efficiently performs communication, and a communication method used for the base station apparatus.

Solution to Problem (1) A first aspect of the present invention is a terminal apparatus including: a reception unit configured to receive indication of a first Physical Downlink Shared Channel (PDSCH) group index in a first downlink control information (DCI) format, and receive indication of a second PDSCH group index different from the first PDSCH group index in a second DCI format; and a transmission unit configured to, in a case that the first DCI format is detected, transmit HARQ-ACK information of the second PDSCH group index, the HARQ-ACK information being determined based at least on a parameter M, wherein a value of a first New Feedback Indicator (NFI) of the second PDSCH group index is indicated by a first NFI field in the second DCI format, a value of a second NFI of the second PDSCH group index is indicated by a second NFI field in the first DCI format, the second NFI field being different from the first NFI field, in a case that the value of the second NFI is not null and the value of the second NFI is different from the value of the first NFI, a value of the parameter M is set to zero, and in a case that the value of the second NFI is null or the value of the second NFI is equal to the value of the first NFI, the value of the parameter M corresponds to the number of monitoring occasions included in a set of the monitoring occasions for a Physical Downlink Control Channel (PDCCH).

(2) A second aspect of the present invention is a base station apparatus including: a transmission unit configured to indicate a first Physical Downlink Shared Channel (PDSCH) group index in a first downlink control information (DCI) format, and indicate a second PDSCH group index different from the first PDSCH group index in a second DCI format; and a reception unit configured to, in a case that the first DCI format is transmitted, receive HARQ-ACK information of the second PDSCH group index, the HARQ-ACK information being determined based at least on a parameter M, wherein a value of a first New Feedback Indicator (NFI) of the second PDSCH group index is indicated by a first NFI field in the second DCI format, a value of a second NFI of the second PDSCH group index is indicated by a second NFI field in the first DCI format, the second NFI field being different from the first NFI field, in a case that the value of the second NFI is not null and the value of the second NFI is different from the value of the first NFI, a value of the parameter M is set to zero, and in a case that the value of the second NFI is null or the value of the second NFI is equal to the value of the first NFI, the value of the parameter M corresponds to the number of monitoring occasions included in a set of the monitoring occasions for a Physical Downlink Control Channel (PDCCH).

(3) A third aspect of the present invention is a communication method for a terminal apparatus, including the steps of: receiving indication of a first Physical Downlink Shared Channel (PDSCH) group index in a first downlink control information (DCI) format; receiving indication of a second PDSCH group index different from the first PDSCH group index in a second DCI format; and in a case that the first DCI format is detected, transmitting HARQ-ACK information of the second PDSCH group index, the HARQ-ACK information being determined based at least on a parameter M, wherein a value of a first New Feedback Indicator (NFI) of the second PDSCH group index is indicated by a first NFI field in the second DCI format, a value of a second NFI of the second PDSCH group index is indicated by a second NFI field in the first DCI format, the second NFI field being different from the first NFI field, in a case that the value of the second NFI is not null and the value of the second NFI is different from the value of the first NFI, a value of the parameter M is set to zero, and in a case that the value of the second NFI is null or the value of the second NFI is equal to the value of the first NFI, the value of the parameter M corresponds to the number of monitoring occasions included in a set of the monitoring occasions for a Physical Downlink Control Channel (PDCCH).

(4) A fourth aspect of the present invention is a communication method for a base station apparatus, including the steps of: indicating a first Physical Downlink Shared Channel (PDSCH) group index in a first downlink control information (DCI) format; indicating a second PDSCH group index different from the first PDSCH group index in a second DCI format; and in a case that the first DCI format is transmitted, receiving HARQ-ACK information of the second PDSCH group index, the HARQ-ACK information being determined based at least on a parameter M, wherein a value of a first New Feedback Indicator (NFI) of the second PDSCH group index is indicated by a first NFI field in the second DCI format, a value of a second NFI of the second PDSCH group index is indicated by a second NFI field in the first DCI format, the second NFI field being different from the first NFI field, in a case that the value of the second NFI is not null and the value of the second NFI is different from the value of the first NFI, a value of the parameter M is set to zero, and in a case that the value of the second NFI is null or the value of the second NFI is equal to the value of the first NFI, the value of the parameter M corresponds to the number of monitoring occasions included in a set of the monitoring occasions for a Physical Downlink Control Channel (PDCCH).

Advantageous Effects of Invention

According to an aspect of the present invention, the terminal apparatus can efficiently perform communication. The base station apparatus can efficiently perform communication.

BRIEF DESCRIPTION OF DRAWINGS

FIG. 2 is an example illustrating a relationship of $N^{slot}_{symb}$, a subcarrier spacing configuration μ, a slot configuration, and a CP configuration according to an aspect of the present embodiment.

FIG. 11 is a diagram illustrating an example related to indication of a counter DAI and a total DAI according to an aspect of the present embodiment.

FIG. 12 is a diagram illustrating an example of a procedure of configuration of a HARQ-ACK codebook according to an aspect of the present embodiment.

FIG. 13 is a diagram illustrating an example of a procedure of configuration of a HARQ-ACK codebook according to an aspect of the present embodiment.

FIG. 14 is a diagram illustrating an example of a procedure of configuration of a HARQ-ACK codebook according to an aspect of the present embodiment.

DESCRIPTION OF EMBODIMENTS

An embodiment of the present invention will be described below.

"A and/or B" may be a term including "A", "B", or "A and B".

ceil(A) is a roof function for A. ceil(A) may be a function that outputs a minimum integer within a range of not falling below A. log 2(B) is a logarithm function for calculating a logarithm of B to base 2. pow(A, B) is a power function defined for a constant A. In other words, pow(A, B) is A to the power of B. mod(E, F) may be a function that outputs a remainder obtained by dividing E by F. mod(E, F) may be a function that outputs a value corresponding to the remainder obtained by dividing E by F. (E)mod(F) may be a function that outputs a remainder obtained by dividing E by F. (E)mod(F) may be a function that outputs a value corresponding to the remainder obtained by dividing E by F.

The fact that a parameter or information indicates one or multiple values may mean that the parameter or the information includes at least a parameter or information indicating the one or the multiple values. A higher layer parameter may be a single higher layer parameter. The higher layer parameter may be an Information Element (IE) including multiple parameters.

Figure 1:
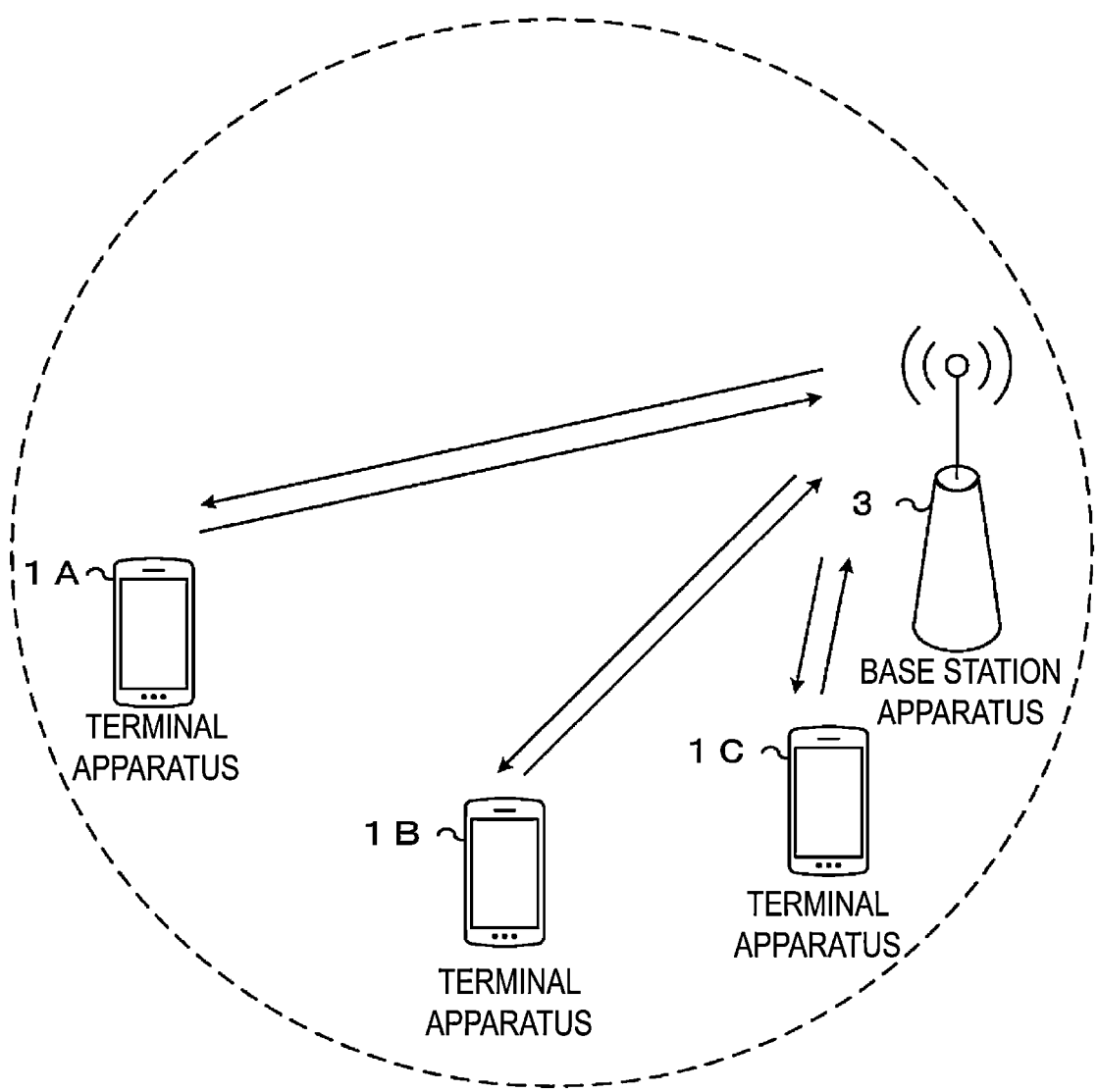
FIG. 1 is a conceptual diagram of a radio communication system according to an aspect of the present embodiment.

FIG. 1 is a conceptual diagram of a radio communication system according to an aspect of the present embodiment. In FIG. 1, the radio communication system includes terminal apparatuses 1A to 1C and a base station apparatus 3. Hereinafter, each of the terminal apparatuses 1A to 1C is also referred to as a terminal apparatus 1.

The base station apparatus 3 may include one of or both a Master Cell Group (MCG) and a Secondary Cell Group (SCG). The MCG is a group of serving cells at least including a Primary Cell (PCell). The SCG is a group of serving cells including at least a Primary Secondary Cell (PSCell). The PCell may be a serving cell that is given based on initial connection. The MCG may include one or multiple Secondary Cells (SCells). The SCG may include one or multiple SCells. A serving cell identity is a short identity for identifying the serving cell. The serving cell identity may be provided by a higher layer parameter.

In the following, frame configuration will be described.

In the radio communication system according to an aspect of the present embodiment, Orthogonal Frequency Division Multiplex (OFDM) is at least used. An OFDM symbol is a unit of OFDM in the time domain. The OFDM symbol at least includes one or multiple subcarriers. The OFDM symbol may be converted into a time-continuous signal in baseband signal generation.

A SubCarrier Spacing (SCS) may be provided by a subcarrier spacing $\Delta f=2^\mu \cdot 15$ kHz. For example, a subcarrier spacing configuration $\mu$ may be configured to be any of 0, 1, 2, 3, 4, and/or 5. For a certain BandWidth Part (BWP), the subcarrier spacing configuration $\mu$ may be provided by a higher layer parameter.

In the radio communication system according to an aspect of the present embodiment, a time unit $T_c$ is used for representing a length of the time domain. The time unit $T_c$ may be given by $T_c=1/(\Delta f_{max} \cdot N_f)$. $\Delta f_{max}$ may be the maximum value of the subcarrier spacing supported by the radio communication system according to an aspect of the present embodiment. $\Delta f_{max}$ may be $\Delta f_{max}=480$ kHz. $N_f$ may be $N_f=4096$. A constant $\kappa$ is $\kappa=\Delta f_{max} \cdot N_f/(\Delta f_{ref} N_{f,\,ref})=64$. $\Delta f_{ref}$ may be 15 kHz. $N_{f,\,ref}$ may be 2048.

The constant $\kappa$ may be a value indicating a relationship between a reference subcarrier spacing and $T_c$. The constant $\kappa$ may be used for the length of a subframe. Based at least on the constant $\kappa$, the number of slots included in the subframe may be given. $\Delta f_{ref}$ is the reference subcarrier spacing, and $N_{f,\,ref}$ is a value corresponding to the reference subcarrier spacing.

Downlink transmission and/or uplink transmission includes frames of 10 ms. The frame includes 10 subframes. The length of the subframe is 1 ms. The length of the frame may be provided regardless of the subcarrier spacing $\Delta f$. In other words, the frame configuration may be provided regardless of $\mu$. The length of the subframe may be provided regardless of the subcarrier spacing $\Delta f$. In other words, the configuration of the subframe may be provided regardless of $\mu$.

For a certain subcarrier spacing configuration $\mu$, the number and indexes of slots included in a subframe may be provided. For example, a first slot number $n^\mu_s$ may be provided in ascending order ranging from 0 to $N^{subframe,\,\mu}_{slot}-1$ within a subframe. For the subcarrier spacing configuration $\mu$, the number and indexes of slots included in a frame may be provided. For example, a second slot number $n^\mu_{s,\,f}$ may be provided in ascending order ranging from 0 to $N^{frame,\,\mu}_{slot}-1$ within a frame. $N^{slot}_{symb}$ continuous OFDM symbols may be included in one slot. $N^{slot}_{symb}$ may be provided based at least on a part or an entirety of a slot configuration and/or a Cyclic Prefix (CP) configuration. The slot configuration may be provided at least by a higher layer parameter tdd-UL-DL-Configuration-Common. The CP configuration may be provided based at least on a higher layer parameter. The CP configuration may be given based at least on dedicated RRC signaling. Each of the first slot number and the second slot number is also referred to as slot number (slot index).

FIG. 2 is an example illustrating a relationship of $N^{slot}_{symb}$, a subcarrier spacing configuration $\mu$, and a CP configuration according to an aspect of the present embodiment. In FIG. 2A, for example, in a case that the subcarrier spacing configuration $\mu$ is two and the CP configuration is a normal cyclic prefix (normal CP), $N^{slot}_{symb}=14$, $N^{frame,\,\mu}_{slot}=40$, and $N^{subframe,\,\mu}_{slot}=4$. In FIG. 2B, for example, in a case that the subcarrier spacing configuration $\mu$ is two and the CP configuration is an extended cyclic prefix (extended CP), $N^{slot}_{symb}=12$, $N^{frame,\,\mu}_{slot}=40$, and $N^{subframe,\,\mu}_{slot}=4$.

Physical resources will be described below.

An antenna port is defined in a manner in which a channel through which a symbol is transmitted in one antenna port can be estimated from a channel through which another symbol is transmitted in the same antenna port. In a case that a large scale property of a channel through which a symbol is transmitted at one antenna port can be estimated from a channel through which a symbol is transmitted at another antenna port, the two antenna ports are referred to as Quasi Co-Located (QCL). The large scale property may at least include long term performance of a channel. The large scale property may at least include a part or all of delay spread, Doppler spread, Doppler shift, an average gain, an average delay, and a beam parameter (spatial Rx parameters). The fact that the first antenna port and the second antenna port are QCL with respect to a beam parameter may mean that a receive beam assumed by a reception unit for the first antenna port and a receive beam assumed by the reception unit for the second antenna port are the same. The fact that the first antenna port and the second antenna port are QCL with respect to a beam parameter may mean that a transmit beam assumed by a reception unit for the first antenna port and a transmit beam assumed by the reception unit for the second antenna port are the same. In a case that the large scale property of a channel through which a symbol is transmitted in one antenna port can be estimated from a channel through which a symbol is transmitted in another antenna port, the terminal apparatus 1 may assume that the two antenna ports are QCL. The fact that two antenna ports are QCL may mean that it is assumed that the two antenna ports are QCL.

For each set of a subcarrier spacing configuration and a carrier, a resource grid including $N^\mu_{RB,\,x} N^{RB}_{sc}$ subcarriers and $N^{(\mu)}_{symb} N^{subframe,\,\mu}_{symb}$ OFDM symbols is provided. $N^\mu_{RB,\,x}$ may indicate the number of resource blocks provided for the subcarrier spacing configuration $\mu$ for a carrier x. $N^\mu_{RB,\,x}$ may indicate the maximum number of resource blocks provided for the subcarrier spacing configuration $\mu$ for the carrier x. The carrier x indicates either a downlink carrier or an uplink carrier. In other words, x is "DL" or "UL". $N^\mu_{RB}$ is a name including $N^\mu_{RB,\,DL}$ and/or $N^\mu_{RB,\,UL}$. $N^{RB}_{sc}$ may indicate the number of subcarriers included in one resource block. At least one resource grid may be provided for each antenna port p and/or for each subcarrier spacing configuration and/or for each Transmission direction configuration. The transmission direction at least includes a DownLink (DL) and an UpLink (UL). Hereinafter, a set of parameters including at least some or all of the antenna port p, the subcarrier spacing configuration $\mu$, and the transmission direction configuration is also referred to as a first radio parameter set. In other words, one resource grid may be provided for each first radio parameter set.

In the downlink, a carrier included in a serving cell is referred to as a downlink carrier (or a downlink component carrier). In the uplink, a carrier included in a serving cell is referred to as an uplink carrier (uplink component carrier). A downlink component carrier and an uplink component carrier are collectively referred to as a component carrier (or a carrier).

Each element in the resource grid provided for each first radio parameter set is referred to as a resource element. The resource element is identified by an index $k_{sc}$ in the frequency domain and an index $l_{sym}$ in the time domain. For a certain first radio parameter set, the resource element is identified by the index $k_{sc}$ in the frequency domain and the index $l_{sym}$ in the time domain. The resource element to be identified by the index $k_{sc}$ of the frequency domain and the index $l_{sym}$ of the time domain is also referred to as a resource element ($k_{sc}, l_{sym}$). The index $k_{sc}$ of the frequency domain indicates any value from 0 to $N^\mu_{RB} N^{RB}_{sc}-1$. $N^\mu_{RB}$ may be the number of resource blocks provided for the subcarrier spacing configuration $\mu$. $N^{RB}_{sc}$ is the number of subcarriers included in the resource block, and $N^{RB}_{sc}=12$. The index $k_{sc}$ in the frequency domain may correspond to the subcarrier index $k_{sc}$. The index $l_{sym}$ in the time domain may correspond to the OFDM symbol index $l_{sym}$.

Figure 3:
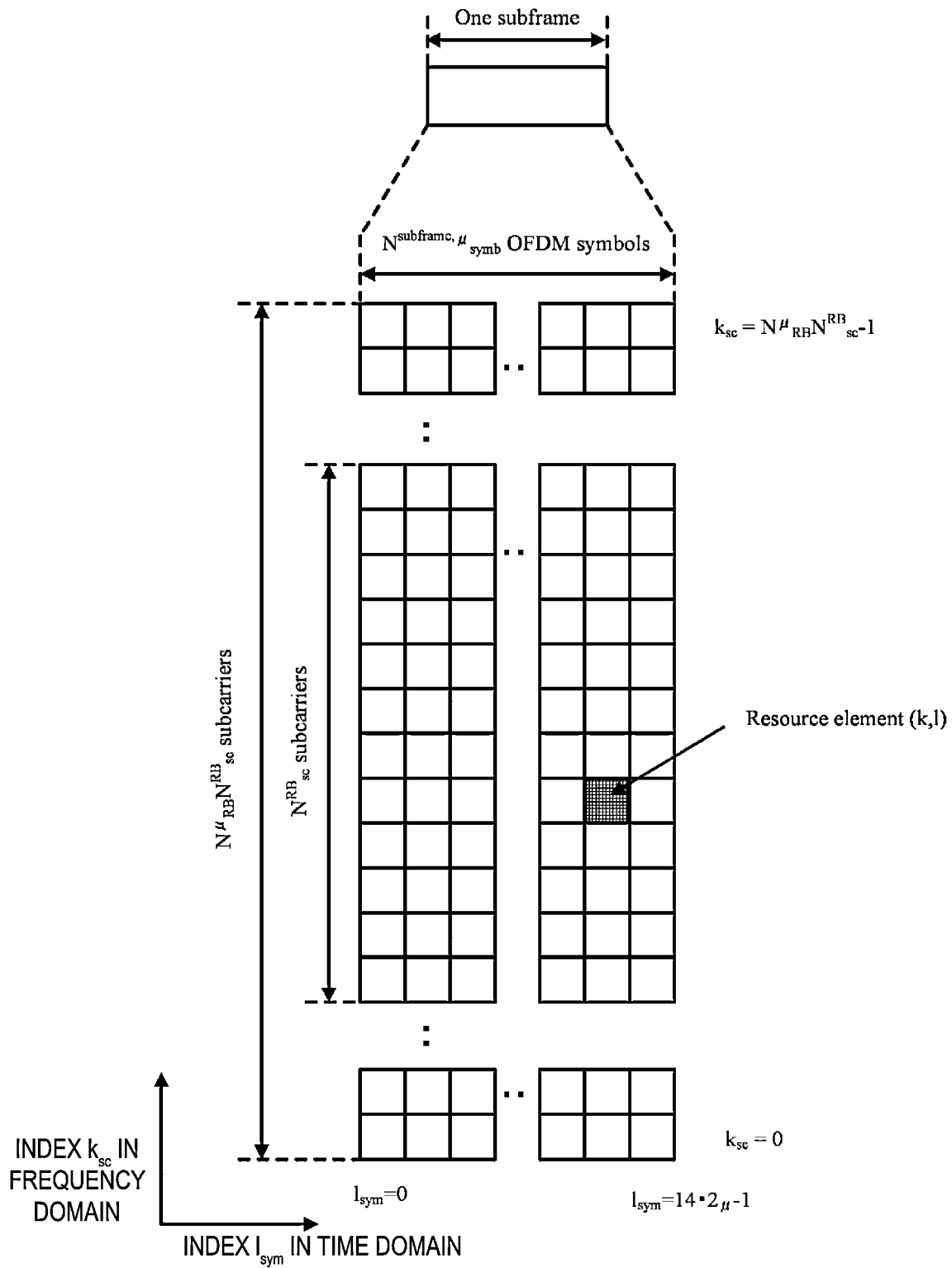
FIG. 3 is a schematic diagram illustrating an example of a resource grid in a subframe according to an aspect of the present embodiment.

FIG. 3 is a schematic diagram illustrating an example of the resource grid in the subframe according to an aspect of the present embodiment. In the resource grid of FIG. 3, the horizontal axis is the index $l_{sym}$ in the time domain, and the vertical axis is the index $k_{sc}$ in the frequency domain. In one subframe, the frequency domain of the resource grid includes $N^{\mu}_{RB}N^{RB}_{sc}$ subcarriers. In one subframe, the time domain of the resource grid may include 14·2µ OFDM symbols. One resource block includes $N^{RB}_{sc}$ subcarriers. The time domain of the resource block may correspond to 1 OFDM symbol. The time domain of the resource block may correspond to 14 OFDM symbols. The time domain of the resource block may correspond to one or multiple slots. The time domain of the resource block may correspond to one subframe.

For the terminal apparatus 1, performing transmission and/or reception by using only a subset of resource grids may be indicated. The subset of resource grids is also referred to as a BWP, and the BWP may be provided based at least on a part or an entirety of the higher layer parameter and/or DCI. The BWP is also referred to as a bandwidth part (BP). In other words, the terminal apparatus 1 may not receive an indication of transmission and/or reception using all sets of resource grids. In other words, the terminal apparatus 1 may receive an indication of transmission and/or reception using some frequency resources within the resource grid. One BWP may include multiple resource blocks in the frequency domain One BWP may include multiple contiguous resource blocks in the frequency domain. A BWP configured for a downlink carrier is also referred to as a downlink BWP. A BWP configured for an uplink carrier is also referred to as an uplink BWP.

One or multiple downlink BWPs may be configured for the terminal apparatus 1. The terminal apparatus 1 may attempt to receive a physical channel (for example, a PDCCH, a PDSCH, and/or an SS/PBCH) in one downlink BWP out of the one or multiple downlink BWPs. The one downlink BWP is also referred to as an active downlink BWP.

One or multiple uplink BWPs may be configured for the terminal apparatus 1. The terminal apparatus 1 may attempt to transmit a physical channel (for example, a PUCCH, a PUSCH, and/or a PRACH) in one uplink BWP out of the one or multiple uplink BWPs. The one uplink BWP is also referred to as an active uplink BWP.

A set of downlink BWPs may be configured for each serving cell. The set of downlink BWPs may include one or multiple downlink BWPs. A set of uplink BWPs may be configured for each serving cell. The set of uplink BWPs may include one or multiple uplink BWPs.

A higher layer parameter is a parameter included in a higher layer signaling. The higher layer signaling may be a Radio Resource Control (RRC) signaling, or may be a Medium Access Control Control Element (MAC CE). Here, the higher layer signaling may be a signal of an RRC layer, or may be a signal of an MAC layer.

The higher layer signaling may be common RRC signaling. The common RRC signaling may at least include a part or all of the following feature C1 to feature C3.

Feature C1) Being mapped to a BCCH logical channel or a CCCH logical channel

Feature C2) Including at least a radioResourceConfig-Common information element

Feature C3) Being mapped to a PBCH

The radioResourceConfigCommon information element may include information indicating a configuration commonly used in a serving cell. The configuration used in a serving cell in common may at least include configuration of the PRACH. The configuration of the PRACH may at least indicate one or multiple random access preamble indexes. The configuration of the PRACH may at least indicate time/frequency resources of the PRACH.

The higher layer signaling may be dedicated RRC signaling. The dedicated RRC signaling may at least include a part or all of the following features D1 to D2.

Feature D1) Being mapped to a DCCH logical channel

Feature D2) Including at least a radioResourceConfigDedicated information element The radioResourceConfigDedicated information element may include at least information indicating a configuration specific to the terminal apparatus 1. The radioResourceConfigDedicated information element may include at least information indicating a BWP configuration. The BWP configuration may indicate at least a frequency resource of the BWP.

For example, a MIB, first system information, and second system information may be included in the common RRC signaling. In addition, a higher layer message that is mapped to the DCCH logical channel and includes at least radioResourceConfigCommon may be included in the common RRC signaling. In addition, a higher layer message that is mapped to the DCCH logical channel and does not include the radioResourceConfigCommon information element may be included in the dedicated RRC signaling. In addition, a higher layer message that is mapped to the DCCH logical channel and includes at least the radioResourceConfigDedicated information element may be included in the dedicated RRC signaling.

The first system information may indicate at least a time index of a Synchronization Signal (SS) block. The SS block is also referred to as an SS/PBCH block. The SS/PBCH block is also referred to as an SS/PBCH. The first system information may include at least information related to a PRACH resource. The first system information may include at least information related to a configuration of initial connection. The second system information may be system information other than the first system information.

The radioResourceConfigDedicated information element may include at least information related to a PRACH resource. The radioResourceConfigDedicated information element may include at least information related to the configuration of initial connection.

In the following, physical channels and physical signals according to various aspects of the present embodiment will be described.

The uplink physical channel may correspond to a set of resource elements for carrying information that is generated in a higher layer. The uplink physical channel is a physical channel that is used in the uplink carrier. In the radio communication system according to an aspect of the present embodiment, at least a part or all of the following uplink physical channels are used.

Physical Uplink Control CHannel (PUCCH)
Physical Uplink Shared CHannel (PUSCH)
Physical Random Access CHannel (PRACH)

The PUCCH may be used to transmit Uplink Control Information (UCI). The uplink control information includes some or all of Channel State Information (CSI), a Scheduling Request (SR), and a Hybrid Automatic Repeat request ACKnowledgement (HARQ-ACK) corresponding to a transport block (TB, a Medium Access Control Protocol Data Unit (MAC PDU), Downlink-Shared Channel (DL-SCH), and/or a Physical Downlink Shared Channel (PDSCH)).

The HARQ-ACK information may include at least an HARQ-ACK bit corresponding at least to one transport block. The HARQ-ACK bit may indicate an acknowledgement (ACK) or a negative-acknowledgement (NACK) corresponding to one or multiple transport blocks. The HARQ-ACK information may include at least an HARQ-ACK codebook including one or multiple HARQ-ACK bits. The fact that the HARQ-ACK bit corresponds to one or multiple transport blocks may mean that the HARQ-ACK bit corresponds to a PDSCH including the one or the multiple transport blocks. The HARQ-ACK bit may indicate an ACK or NACK corresponding to one Code Block Group (CBG) included in the transport block.

The Scheduling Request (SR) may be used at least for requesting a resource of a PUSCH for initial transmission. A scheduling request bit may be used to indicate either a positive SR or a negative SR. The scheduling request bit indicating the positive SR is also referred to as "the positive SR being transmitted". The positive SR may indicate that resources of the PUSCH for initial transmission are requested by the terminal apparatus 1. The positive SR may indicate that a scheduling request is triggered by the higher layer. The positive SR may be transmitted in a case that the higher layer indicates transmission of the scheduling request. The scheduling request bit indicating the negative SR is also referred to as "the negative SR being transmitted". The negative SR may indicate that resources of the PUSCH for initial transmission are not requested by the terminal apparatus 1. The negative SR may indicate that the scheduling request is not triggered by the higher layer. The negative SR may be transmitted in a case that transmission of a scheduling request is not indicated by the higher layer.

Channel state information may include at least some or all of a Channel Quality Indicator (CQI), a Precoder Matrix Indicator (PMI), and a Rank Indicator (RI). The CQI is an indicator related to quality of a channel (for example, propagation intensity), and the PMI is an indicator indicating a precoder. The RI is an indicator indicating a transmission rank (or the number of transmission layers).

The PUCCH supports PUCCH formats (PUCCH formats 0 to 4). The PUCCH formats may be mapped to the PUCCH and may then be transmitted. The PUCCH format may be transmitted on the PUCCH. The fact that the PUCCH format is transmitted may mean that the PUCCH is transmitted.

The PUSCH may be used at least to transmit a transport block ((TB), the MAC PDU, a UL-SCH, and/or the PUSCH). The PUSCH may be used to transmit at least some or all of the transport block, the HARQ-ACK information, the channel state information, and the scheduling request. The PUSCH is used at least to transmit a random access message 3.

The PRACH is used at least to transmit a random access preamble (random access message 1). The PRACH may be used at least to indicate some or all of an initial connection establishment procedure, a handover procedure, a connection re-establishment procedure, synchronization for PUSCH transmission (timing adjustment), and a resource request for the PUSCH. The random access preamble may be used for notifying an index (random access preamble index) that is given by a higher layer of the terminal apparatus 1 to the base station apparatus 3.

In FIG. 1, in uplink radio communication, the following uplink physical signals are used. The uplink physical signals need not be used for transmitting information output from a higher layer, but are used by a physical layer.

UpLink Demodulation Reference Signal (UL DMRS)
Sounding Reference Signal (SRS)
UpLink Phase Tracking Reference Signal (UL PTRS)

The UL DMRS is related to transmission of the PUSCH and/or the PUCCH. The UL DMRS is multiplexed on the PUSCH or the PUCCH. The base station apparatus 3 may use the UL DMRS for performing channel compensation of the PUSCH or the PUCCH. In the following, concurrent transmission of the PUSCH and the UL DMRS related to the PUSCH is simply referred to as transmission of the PUSCH. In the following, concurrent transmission of the PUCCH and the UL DMRS related to the PUCCH is simply referred to as transmission of the PUCCH. The UL DMRS related to the PUSCH is also referred to as the UL DMRS for the PUSCH. The UL DMRS related to the PUCCH is also referred to as the UL DMRS for the PUCCH.

The SRS need not be related to transmission of the PUSCH or the PUCCH. The base station apparatus 3 may use the SRS for measurement of a channel state. The SRS may be transmitted at the end of a subframe in an uplink slot or in a certain number of OFDM symbols from the end.

The UL PTRS may be a reference signal that is at least used for phase tracking. The UL PTRS may be related to a UL DMRS group at least including an antenna port used for one or multiple UL DMRSs. The fact that the UL PTRS and the UL DMRS group are related to each other may mean that an antenna port of the UL PTRS and a part or all of antenna ports included in the UL DMRS group are at least QCL. The UL DMRS group may be identified based at least on an antenna port having the smallest index in the UL DMRSs included in the UL DMRS group. The UL PTRS may be mapped to an antenna port having the smallest index in one or multiple antenna ports to which one codeword is mapped. The UL PTRS may be mapped to the first layer in a case that one codeword is at least mapped to the first layer and the second layer. The UL PTRS need not be mapped to the second layer. The index of the antenna port to which the UL PTRS is mapped may be given based at least on downlink control information.

In FIG. 1, in downlink radio communication from the base station apparatus 3 to the terminal apparatus 1, the following downlink physical channels are used. The downlink physical channels are used by a physical layer for transmitting information output from a higher layer.

Physical Broadcast Channel (PBCH)
Physical Downlink Control Channel (PDCCH)
Physical Downlink Shared Channel (PDSCH)

The PBCH is used at least to transmit a Master Information Block ((MIB), and/or a Broadcast Channel(BCH)). The PBCH may be transmitted based on a prescribed transmission interval. The PBCH may be transmitted at an interval of 80 ms. The PBCH may be transmitted at intervals of 160 ms. Contents of information included in the PBCH may be updated at every 80 ms. A part or an entirety of the information included in the PBCH may be updated at every 160 ms. The PBCH may include 288 subcarriers. The PBCH may include 2, 3, or 4 OFDM symbols. The MIB may include information associated with an identifier (index) of a synchronization signal. The MIB may include information indicating at least a part of a number of the slot, a number of a subframe, and/or a number of a radio frame in which the PBCH is transmitted.

The PDCCH is used at least to transmit Downlink Control Information (DCI). The PDCCH may be transmitted with at least the downlink control information included therein. The PDCCH may include the downlink control information. The downlink control information is also referred to as a DCI format. The downlink control information may include at least either a downlink grant or an uplink grant. The DCI format used for scheduling the PDSCH is also referred to as a downlink DCI format. The DCI format used for scheduling the PUSCH is also referred to as an uplink DCI format. The downlink grant is also referred to as downlink assignment or downlink allocation. The uplink DCI format at least includes one or both of DCI format 0_0 and DCI format 0_1.

DCI format 0_0 includes at least some or all of 1A to 1E.

1A) DCI format identification field (Identifier for DCI formats field)

1B) Frequency domain resource allocation field (Frequency domain resource assignment field)

1C) Time domain resource allocation field (Time domain resource assignment field)

1D) Frequency hopping flag field

1E) Modulation and Coding Scheme field (MCS field)

The DCI format identification field may be used at least to indicate which of one or multiple DCI formats the DCI format including the DCI format identification field corresponds to. The one or multiple DCI formats may be given based at least on a part or all of DCI format 1_0, DCI format 1_1, DCI format 0_0, and/or DCI format 0_1.

The frequency domain resource assignment field may be used at least to indicate assignment of a frequency resource for the PUSCH scheduled by the DCI format including the frequency domain resource assignment field. The frequency domain resource assignment field is also referred to as Frequency Domain Resource Allocation (FDRA) field.

The time domain resource assignment field may be used at least to indicate assignment of a time resource for the PUSCH scheduled by the DCI format including the time domain resource assignment field.

The frequency hopping flag field may be used at least to indicate whether frequency hopping is to be applied to the PUSCH scheduled by the DCI format including the frequency hopping flag field.

The MCS field may be used at least to indicate some or all of a modulation scheme for the PUSCH scheduled by the DCI format including the MCS field and/or a target coding rate. The target coding rate may be a target coding rate for a transport block of the PUSCH. The size of the transport block (Transport Block Size (TBS)) may be provided based at least on the target coding rate.

DCI format 0_1 includes at least some or all of 2A to 2I.

2A) DCI format identification field

2B) Frequency domain resource allocation field

2C) Time domain resource allocation field

2D) Frequency hopping flag field

2E) MCS field

2F) CSI request field

2G) BWP field

2H) First UL DAI field (first downlink assignment index)

2I) Second UL DAI field (second downlink assignment index)

The first UL DAI field is used at least for indicating a transmission state of the PDSCH. In a case that a Dynamic HARQ-ACK codebook is used, the size of the first UL DAI field may be 2 bits.

The second UL DAI field is used at least for indicating a transmission state of the PDSCH. In a case that the dynamic HARQ-ACK codebook including two sub-codebooks is used, the size of the second UL DAI field may be 2 bits.

The BWP field may be used for indicating an uplink BWP to which the PUSCH that is scheduled by DCI format 0_1 is mapped.

The CSI request field is at least used for indicating the report of the CSI. The size of the CSI request field may be given based at least on a higher layer parameter ReportTriggerSize.

The downlink DCI format at least includes one or both of DCI format 1_0 and DCI format 1_1.

DCI format 1_0 includes at least some or all of 3A to 3I.

3A) DCI format identification field (Identifier for DCI formats field)

3B) Frequency domain resource allocation field (Frequency domain resource assignment field)

3C) Time domain resource allocation field (Time domain resource assignment field)

3D) Frequency hopping flag field

3E) Modulation and Coding Scheme field (MCS field)

3F) First CSI request field

3G) PDSCH-to-HARQ feedback timing indicator field

3H) PUCCH resource indication field (PUCCH resource indicator field)

3I) First DAI field (first Downlink Assignment Index field)

The timing indication field from the PDSCH to the HARQ feedback may be a field indicating a timing K1. In a case that the index of the slot including the last OFDM symbol of the PDSCH is a slot n, the index of the slot including the PUCCH or the PUSCH including at least HARQ-ACK information corresponding to the transport block included in the PDSCH may be n+K1. In a case that the index of the slot including the last OFDM symbol of the PDSCH is a slot n, the index of the slot including the OFDM symbol at the head of the PUCCH or the OFDM symbol at the head of the PUSCH including at least HARQ-ACK information corresponding to the transport block included in the PDSCH may be n+K1.

The PDSCH-to-HARQ feedback timing indicator field (PDSCH-to-HARQ_feedback timing indicator field) may be hereinafter referred to as an HARQ indicator field.

The PUCCH resource indicator field may be a field indicating indexes of one or multiple PUCCH resources included in the PUCCH resource set.

Details of the first DAI field will be described later.

DCI format 1_1 includes at least some or all of 4A to 4M.

4A) DCI format identification field (Identifier for DCI formats field)

4B) Frequency domain resource allocation field (Frequency domain resource assignment field)

4C) Time domain resource allocation field (Time domain resource assignment field)

4D) Frequency hopping flag field

4E) Modulation and Coding Scheme field (MCS field)

4F) First CSI request field

4G) PDSCH-to-HARQ feedback timing indicator field

4H) PUCCH resource indication field (PUCCH resource indicator field)

4I) BWP field

4J) PGI field (PDSCH Group Index field)

4K) NFI field (New Feedback Indicator field)

4L) NRPG field (Number of Requested PDSCH Groups field)

4M) Second DAI field (second Downlink Assignment Index field)

The BWP field may be used to indicate the downlink BWP to which the PDSCH scheduled by DCI format 1_1 is mapped.

The PGI field may be used for indicating a PDSCH group index (PDSCH Group Index (PGI)) corresponding to the PDSCH scheduled by DCI format 1_1. In a case that pdsch-HARQ-ACK-Codebook is set to enhancedDynamic-r16, the PGI field may be 1 bit. In a case that pdsch-HARQ-ACK-Codebook is not set to enhancedDynamic-r16, the PGI field may be 0 bits.

For the terminal apparatus 1, the PGI may be associated with each PDSCH. The PGI of a certain PDSCH may be indicated based at least on the DCI format used for scheduling of the PDSCH. For example, a field indicating the PGI (PGI field) may be included in the DCI format. For example, the PDSCH group may be a set of PDSCHs having the same PDSCH group index (PGI). The PDSCH group may be one PDSCH, or a set of one or more PDSCHs associated with the same PGI. The number of PDSCH groups configured for the terminal apparatus 1 is $N_{group}$. $N_{group}$ may be 1, may be 2, may be 3, may be 4, or may be an integer of 0 or greater except for the numbers given. The number of PDSCH groups that can be configured for the terminal apparatus 1 is $N_{group, max}$. For example, for the terminal apparatus 1, the number of PDSCH groups corresponding to an integer value of $N_{group, max}$ or less may be configured. It may be set based at least on $N_{group}$ and/or an RRC parameter. The terminal apparatus 1 may determine a PDSCH group associated with a certain PDSCH, based at least on the value of the PGI field included in the DCI field used for scheduling of the certain PDSCH.

The NRPG field may be used for indicating a request PDSCH group. In a case that pdsch-HARQ-ACK-Codebook is set to enhancedDynamic-r16, the NRPG field may be 1 bit. In a case that pdsch-HARQ-ACK-Codebook is not set to enhancedDynamic-r16, the NRPG field may be 0 bits. A Requested PDSCH Group (RPG) may be a PDSCH group corresponding to the HARQ-ACK information transmitted (reported) via the following PUCCH or PUSCH. The terminal apparatus 1 may generate the HARQ-ACK codebook for the indicated RPG, and transmit (report) the HARQ-ACK codebook via the PUCCH or the PUSCH. The request PDSCH group (RPG) may include one or multiple PDSCH groups. The RPG may be indicated based at least on the NRPG field included in the DCI format. The terminal apparatus 1 may determine the RPG, based at least on a value of the NRPG field.

The NFI field may be used for indicating the NFI corresponding to a PDSCH group (scheduled PDSCH group) associated with the PDSCH scheduled by DCI format 1_1 and/or the NFI corresponding to a PDSCH group (non-scheduled PDSCH group) different from the above-described PDSCH group. In a case that pdsch-HARQ-ACK-Codebook is set to enhancedDynamic-r16, and NFI-TotalDAI-Included-r16 is set to enable, the NRPG field may be 2 bits. The 2 bits of the NFI field may be used for indication of each of the NFI corresponding to a PDSCH group (scheduled PDSCH group) associated with the PDSCH scheduled by DCI format 1_1 and the NFI corresponding to a PDSCH group (non-scheduled PDSCH group) different from the PDSCH group. In a case that pdsch-HARQ-ACK-Codebook is set to enhancedDynamic-r16, and NFI-TotalDAI-Included-r16 is not set, the NFI field may be 1 bit. The NFI field of 1 bit may be used for indicating the NFI corresponding to a PDSCH group (scheduled PDSCH group) associated with the PDSCH scheduled by DCI format 1_1. In a case that pdsch-HARQ-ACK-Codebook is not set to enhancedDynamic-r16, the NFI field may be 0 bits.

Description of the first DAI field and the second DAI field will be given later.

DCI format 2_0 may at least include one or multiple Slot Format Indicators (SFIs).

Each DCI format (DCI format 1_0, DCI format 1_1, DCI format 0_0, and/or DCI format 0_1 DCI format 1_1) may include a field different from the fields described above.

In various aspects of the present embodiment, the number of resource blocks indicates the number of resource blocks in the frequency domain unless otherwise specified.

The downlink grant is used at least for scheduling a single PDSCH in a single serving cell.

The uplink grant is used at least for scheduling a single PUSCH in a single serving cell.

One physical channel may be mapped to one serving cell. A single physical channel may be mapped to a single BWP configured to a single carrier included in a single serving cell.

In the terminal apparatus 1, one or multiple COntrol REsource SETs (CORESETs) may be configured. The terminal apparatus 1 monitors the PDCCH in the one or multiple control resource sets. Here, monitoring of the PDCCH in the one or multiple control resource sets may include monitoring of one or multiple PDCCHs corresponding to the one or multiple control resource sets, respectively. Note that the PDCCH may include a set of one or multiple PDCCH candidates and/or one or multiple PDCCH candidates. Also, monitoring of the PDCCH may include monitoring and detecting the PDCCH and/or a DCI format transmitted via the PDCCH.

The control resource set may indicate a time-frequency domain to which one or multiple PDCCHs can be mapped. The control resource set may be an area in which the terminal apparatus 1 monitors the PDCCH. The control resource set may include continuous resources (Localized resources). The control resource set may include non-continuous resources (distributed resources).

In the frequency domain, the unit of mapping of the control resource set may be a resource block. In the frequency domain, for example, the unit of mapping of the control resource set may be six resource blocks. In the time domain, the unit of mapping of the control resource set may be an OFDM symbol. In the time domain, for example, the unit of mapping of the control resource set may be one OFDM symbol.

Mapping of the control resource set to the resource block may be provided based at least on the higher layer parameter. The higher layer parameter may include a bitmap for a Resource Block Group (RBG). The resource block group may be provided by six continuous resource blocks.

The number of OFDM symbols included in the control resource set may be provided based at least on the higher layer parameter.

A certain control resource set may be a Common control resource set. The common control resource set may be a control resource set configured commonly to multiple terminal apparatuses 1. The common control resource set may be provided at least based on some or all of the MIB, the first system information, the second system information, the common RRC signaling, and a cell ID. For example, the time resource and/or the frequency resource of the control resource set configured to monitor the PDCCH to be used for scheduling the first system information may be provided based at least on the MIB.

The control resource set configured by the MIB is also referred to as CORESET #0. CORESET #0 may be a control resource set of index #0.

A certain control resource set may be a Dedicated control resource set. The dedicated control resource set may be a control resource set configured to be used exclusively for the terminal apparatus 1. The dedicated control resource set may be provided based at least on some or all of the dedicated RRC signaling and values of C-RNTI. Multiple control resource sets may be configured for the terminal apparatus 1, and an index (control resource set index) may be provided for each of the control resource sets. One or more control channel elements (CCEs) may be configured in the control resource set, and an index (CCE index) may be provided for each of the CCEs.

A set of candidates of the PDCCH monitored by the terminal apparatus 1 may be defined from the perspective of a search space. In other words, the set of PDCCH candidates monitored by the terminal apparatus 1 may be given by a search space.

The search space may include one or multiple PDCCH candidates of one or multiple Aggregation levels. The aggregation level of the PDCCH candidates may indicate the number of CCEs constituting the PDCCH. The PDDCH candidate may be mapped to one or multiple CCEs.

The terminal apparatus 1 may monitor at least one or multiple search spaces in the slot in which DRX (Discontinuous reception) is not configured. The DRX may be provided based at least on a higher layer parameter. The terminal apparatus 1 may monitor at least one or multiple Search space sets in the slot in which DRX is not configured. Multiple search space sets may be configured for the terminal apparatus 1. An index (search space set index) may be provided for each of the search space sets.

The search space set may at least include one or multiple search spaces. An index (search space index) may be provided for each of the search spaces.

Each search space set may be associated at least with one control resource set. Each search space set may be included in one control resource set. For each of the search space sets, the index of the control resource set related to the search space set may be given.

For each of the search space sets, a monitoring periodicity of the search space set may be configured. The monitoring periodicity of the search space set may at least indicate the interval of the slot in which monitoring of the search space set is performed by the terminal apparatus 1. A higher layer parameter at least indicating the monitoring periodicity of the search space set may be given for each search space set.

For each of the search space sets, a Monitoring offset of the search space set may be configured. The monitoring offset of the search space set may at least indicate an offset from a reference index (for example, slot #0) of an index of a slot in which monitoring of the search space set is performed by the terminal apparatus 1. A higher layer parameter at least indicating the monitoring offset of the search space set may be given for each search space set.

For each of the search space sets, a Monitoring pattern of the search space set may be configured. The monitoring pattern of the search space set may indicate the first OFDM symbol for the search space set in which monitoring is performed. The monitoring pattern of the search space set may be given by a bitmap indicating the first OFDM symbol in one or multiple slots. A higher layer parameter at least indicating the monitoring pattern of the search space set may be given for each search space set.

A Monitoring occasion for the search space set may be given based at least on a part or all of the monitoring periodicity of the search space set, the monitoring offset of the search space set, the monitoring pattern of the search space set, and/or configuration of DRX.

Figure 4:
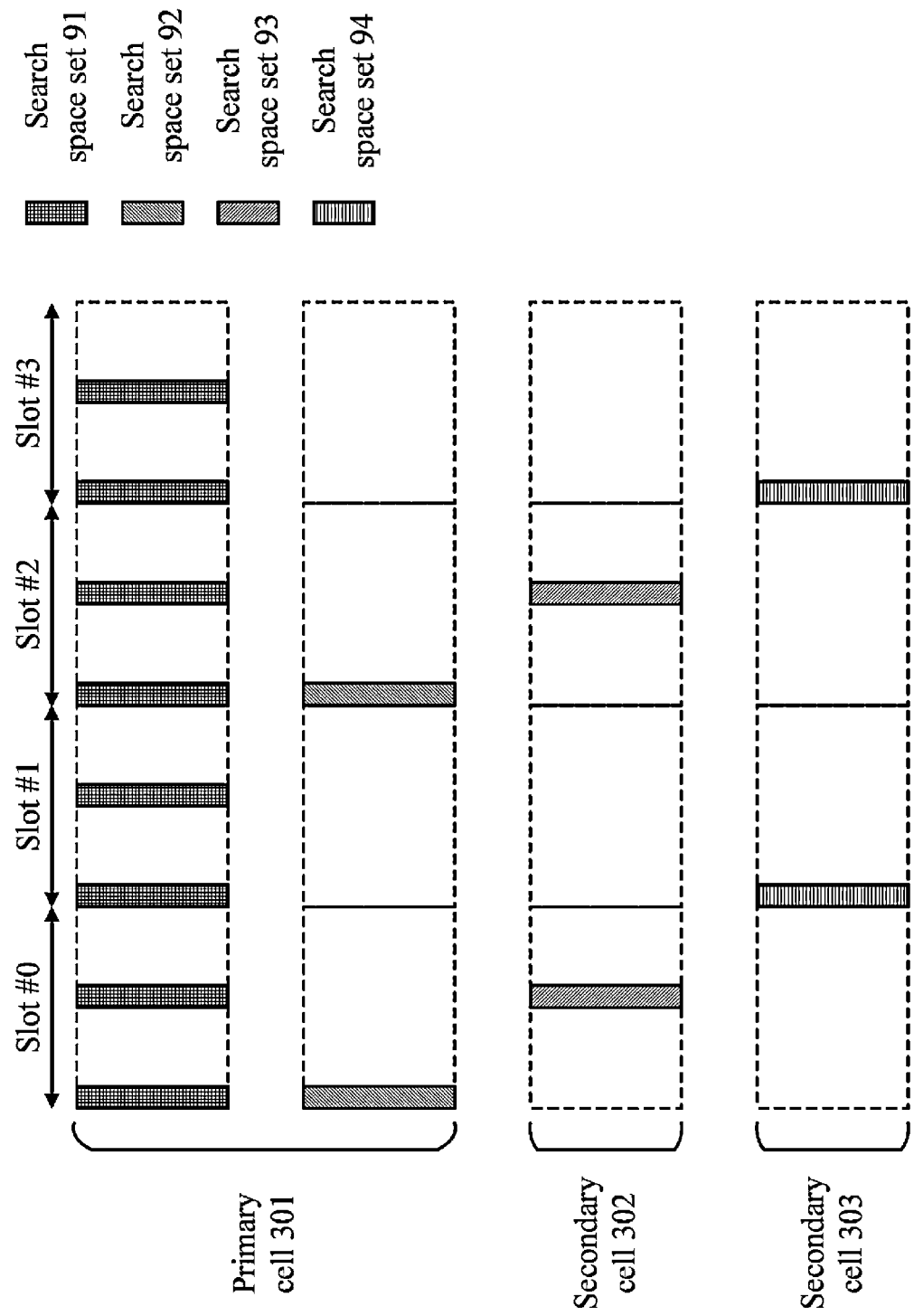
FIG. 4 is a diagram illustrating an example of monitoring occasions for search space sets according to an aspect of the present embodiment.

FIG. 4 is a diagram illustrating an example of the monitoring occasion for the search space set according to an aspect of the present embodiment. In FIG. 4, a search space set 91 and a search space set 92 are configured in a primary cell 301, a search space set 93 is configured in a secondary cell 302, and a search space set 94 is configured in a secondary cell 303.

In FIG. 4, each block hatched with grid lines represents the search space set 91, each block hatched with lines rising diagonally up and to the right represents the search space set 92, each block hatched with lines rising diagonally up and to the left represents the search space set 93, and each block hatched with horizontal lines represents the search space set 94.

The monitoring periodicity of the search space set 91 is set to one slot, the monitoring offset of the search space set 91 is set to zero slots, and the monitoring pattern of the search space set 91 is set to [1, 0, 0, 0, 0, 0, 0, 1, 0, 0, 0, 0, 0, 0]. In other words, the monitoring occasion for the search space set 91 is the first OFDM symbol (OFDM symbol #0) and the eighth OFDM symbol (OFDM symbol #7) in each of the slots.

The monitoring periodicity of the search space set 92 is set to two slots, the monitoring offset of the search space set 92 is set to zero slots, and the monitoring pattern of the search space set 92 is set to [1, 0, 0, 0, 0, 0, 0, 0, 0, 0, 0, 0, 0, 0]. In other words, the monitoring occasion for the search space set 92 is the first OFDM symbol (OFDM symbol #0) in each of the even-numbered slots.

The monitoring periodicity of the search space set 93 is set to two slots, the monitoring offset of the search space set 93 is set to zero slots, and the monitoring pattern of the search space set 93 is set to [0, 0, 0, 0, 0, 0, 0, 1, 0, 0, 0, 0, 0, 0]. In other words, the monitoring occasion for the search space set 93 is the eighth OFDM symbol (OFDM symbol #7) in each of the even-numbered slots.

The monitoring periodicity of the search space set 94 is set to two slots, the monitoring offset of the search space set 94 is set to one slot, and the monitoring pattern of the search space set 94 is set to [1, 0, 0, 0, 0, 0, 0, 0, 0, 0, 0, 0, 0, 0]. In other words, the monitoring occasion for the search space set 94 is the first OFDM symbol (OFDM symbol #0) in each of the odd-numbered slots.

The physical resources of the search space include configuration units (Control Channel Elements (CCEs)) of a control channel. The CCE includes a prescribed number of Resource Element Groups (REGs). For example, the CCE may include six REGs. The REG may include one Physical Resource Block (PRB) during one OFDM symbol. In other words, the REG may include 12 Resource Elements (REs). The PRB is also simply referred to as a Resource Block (RB).

The PDSCH is used at least to transmit the transport block. The PDSCH may be used at least to transmit a random access message 2 (random access response). The PDSCH may be used at least to transmit system information including parameters used for initial access.

In FIG. 1, in downlink radio communication, the following downlink physical signals are used. The downlink physical signals need not be used for transmitting information output from a higher layer, but are used by a physical layer.

Synchronization Signal (SS)
DownLink DeModulation Reference Signal (DL DMRS)
Channel State Information-Reference Signal (CSI-RS)
DownLink Phase Tracking Reference Signal (DL PTRS)

The synchronization signal is used by the terminal apparatus 1 to establish synchronization with a downlink frequency domain and/or time domain. The synchronization signal includes a Primary Synchronization Signal (PSS) and a Secondary Synchronization Signal (SSS).

An SS block (SS/PBCH block) includes at least some or all of the PSS, the SSS, and the PBCH.

The DL DMRS is related to transmission of the PBCH, the PDCCH, and/or the PDSCH. The DL DMRS is multiplexed on the PBCH, the PDCCH, and/or the PDSCH. In order to channel compensation of the PBCH, the PDCCH, or the PDSCH, the terminal apparatus 1 may use the DL DMRS corresponding to the PBCH, the PDCCH, or the PDSCH.

The CSI-RS may be a signal used at least to calculate channel state information. A pattern of the CSI-RS assumed by the terminal apparatus may be provided at least by a higher layer parameter.

The PTRS may be a signal that is at least used for compensation of phase noise. A pattern of the PTRS assumed by the terminal apparatus may be provided based at least on a higher layer parameter and/or the DCI.

The DL PTRS may be related to the DL DMRS group at least including an antenna port used for one or multiple DL DMRSs.

The downlink physical channel and the downlink physical signal are also collectively referred to as the downlink signal. The uplink physical channel and the uplink physical signal are also collectively referred to as the uplink signal. The downlink signal and the uplink signal are also collectively referred to as the physical signal. The downlink signal and the uplink signal are also collectively referred to as the signal. The downlink physical channel and the uplink physical channel are collectively referred to as the physical channel. The downlink physical signal and the uplink physical signal are collectively referred to as the physical signal.

A Broadcast CHannel (BCH), an Uplink-Shared CHannel (UL-SCH), and a Downlink-Shared CHannel (DL-SCH) are transport channels. A channel used in a Medium Access Control (MAC) layer is referred to as a transport channel A unit of the transport channel used in the MAC layer is also referred to as a transport block (TB) or an MAC PDU. Control of the Hybrid Automatic Repeat reQuest (HARQ) is performed for each transport block in the MAC layer. The transport block is a unit of data that the MAC layer delivers to the physical layer. In the physical layer, the transport block is mapped to a codeword, and modulation processing is performed for each codeword.

The base station apparatus 3 and the terminal apparatus 1 exchange (transmit and/or receive) a higher layer signaling in a higher layer. For example, the base station apparatus 3 and the terminal apparatus 1 may transmit and/or receive, in a Radio Resource Control (RRC) layer, RRC signaling (a Radio Resource Control (RRC) message and/or Radio Resource Control (RRC) information). The base station apparatus 3 and the terminal apparatus 1 may transmit and/or receive an MAC Control Element (CE) in the MAC layer. Here, the RRC signaling and/or the MAC CE is also referred to as a higher layer signaling.

The PUSCH and the PDSCH may be at least used for transmitting the RRC signaling and/or the MAC CE. Here, the RRC signaling transmitted on the PDSCH from the base station apparatus 3 may be signaling that is common to multiple terminal apparatuses 1 in a serving cell. The signaling common to the multiple terminal apparatuses 1 in the serving cell is also referred to as common RRC signaling. The RRC signaling transmitted from the base station apparatus 3 through the PDSCH may be signaling dedicated to a certain terminal apparatus 1 (also referred to as dedicated signaling or UE specific signaling). The signaling dedicated to the terminal apparatus 1 is also referred to as dedicated RRC signaling. A serving cell-specific higher layer parameter may be transmitted using the signaling common to the multiple terminal apparatuses 1 in the serving cell or the signaling dedicated to a certain terminal apparatus 1. A UE-specific higher layer parameter may be transmitted using signaling dedicated to a certain terminal apparatus 1.

A Broadcast Control CHannel (BCCH), a Common Control CHannel (CCCH), and a Dedicated Control CHannel (DCCH) are logical channels. For example, the BCCH is a channel of a higher layer that is used for transmitting the MIB. The Common Control CHannel (CCCH) is a channel of a higher layer that is used for transmitting common information in multiple terminal apparatuses 1. Here, the CCCH may be, for example, used for the terminal apparatus 1 that is not in a state of RRC connection. The Dedicated Control CHannel (DCCH) is a channel of a higher layer that is at least used for transmitting control information (dedicated control information) that is dedicated to the terminal apparatus 1. Here, the DCCH may be, for example, used for the terminal apparatus 1 that is in a state of RRC connection.

The BCCH in the logical channel may be mapped to the BCH, the DL-SCH, or the UL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped to the PUSCH in the physical channel. The DL-SCH in the transport channel may be mapped to the PDSCH in the physical channel. The BCH in the transport channel may be mapped to the PBCH in the physical channel.

In the following, a configuration example of the terminal apparatus 1 according to an aspect of the present embodiment will be described.

Figure 5:
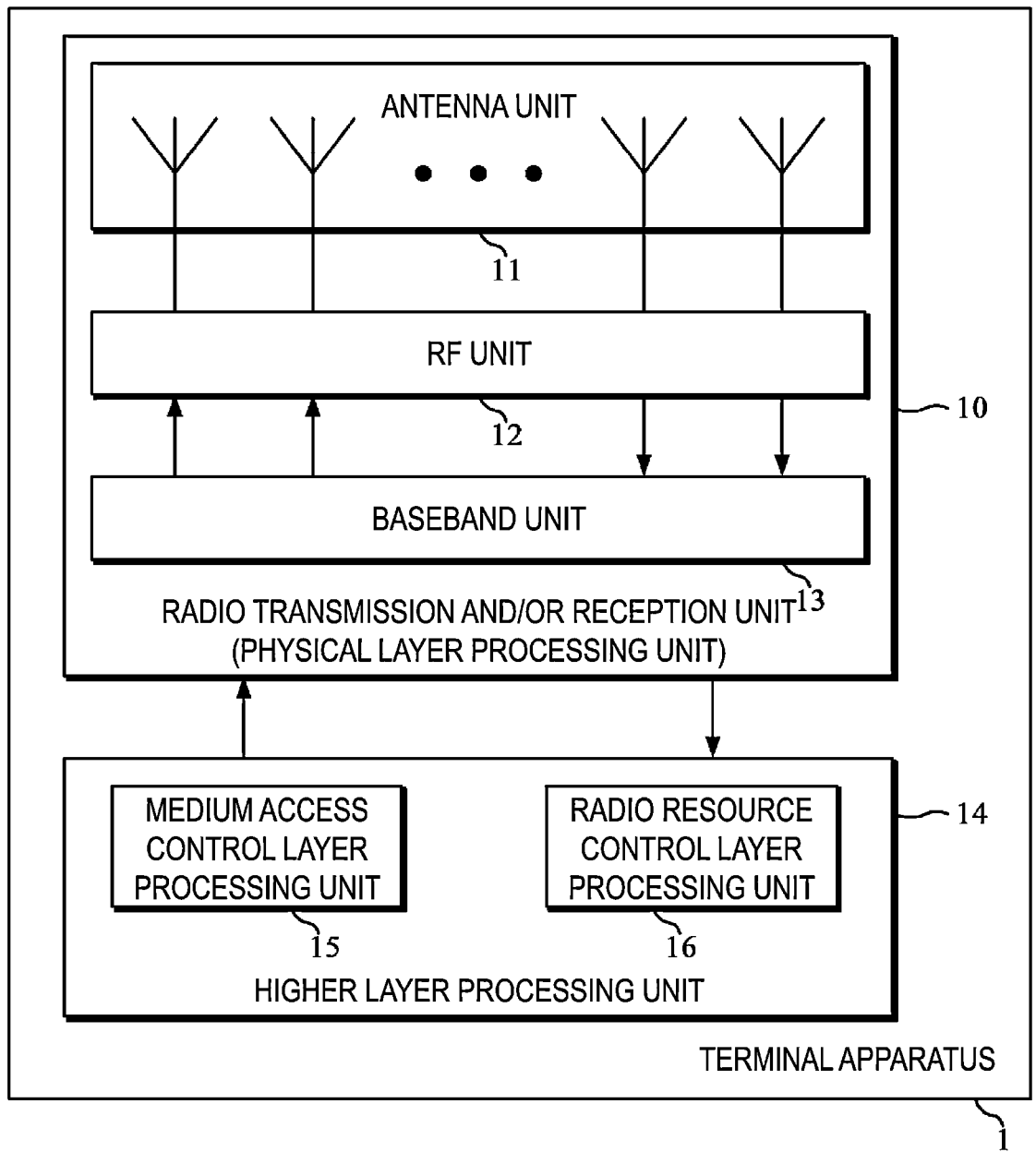
FIG. 5 is a schematic block diagram illustrating a configuration of a terminal apparatus 1 according to an aspect of the present embodiment.

FIG. 5 is a schematic block diagram illustrating a configuration of the terminal apparatus 1 according to an aspect of the present embodiment. As illustrated in the figure, the terminal apparatus 1 includes a radio transmission and/or reception unit 10 and a higher layer processing unit 14. The radio transmission and/or reception unit 10 at least includes a part or all of an antenna unit 11, a Radio Frequency (RF) unit 12, and a baseband unit 13. The higher layer processing unit 14 at least includes a part or all of a medium access control layer processing unit 15 and a radio resource control layer processing unit 16. The radio transmission and/or reception unit 10 may include at least a part or all of a transmission unit and a reception unit.

The higher layer processing unit 14 outputs uplink data (transport block) generated by a user operation or the like to the radio transmission and/or reception unit 10. The higher layer processing unit 14 performs processing of an MAC layer, a Packet Data Convergence Protocol (PDCP) layer, a Radio Link Control (RLC) layer, and an RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 performs management of various pieces of configuration information/parameters of its apparatus. The radio resource control layer processing unit 16 sets various pieces of configuration information/parameters, based on a higher layer signaling received from the base station apparatus 3. Specifically, the radio resource control layer processing unit 16 sets various pieces of configuration information/parameters, based on information indicating the various pieces of configuration information/parameters received from the base station apparatus 3. Note that the configuration information may include information related to the processing or configurations of the physical channel, the physical signal (that is, the physical layer), the MAC layer, the PDCP layer, the RLC layer, and the RRC layer. The parameters may be higher layer parameters.

The radio transmission and/or reception unit 10 performs processing of the physical layer, such as modulation, demodulation, coding, and decoding. The radio transmission and/or reception unit 10 separates, demodulates, and decodes a received physical signal, and outputs the decoded information to the higher layer processing unit 14. The radio transmission and/or reception unit 10 generates a physical signal by performing modulation and coding of data and generating a baseband signal (conversion into a time-continuous signal) and transmits the physical signal to the base station apparatus 3.

The RF unit 12 converts (down converts) a signal received via the antenna unit 11 into a baseband signal by orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the converted digital signal, performs a Fast Fourier Transform (FFT) on the signal from which the CP has been removed, and extracts a signal in the frequency domain.

The baseband unit 13 generates an OFDM symbol by performing Inverse Fast Fourier Transform (IFFT) on the data, adds CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 through a low-pass filter, up converts the analog signal into a signal of a carrier frequency, and transmits the up converted signal via the antenna unit 11. The RF unit 12 amplifies power. The RF unit 12 may have a function of controlling transmission power. The RF unit 12 is also referred to as a transmission power control unit.

In the following, a configuration example of the base station apparatus 3 according to an aspect of the present embodiment will be described.

Figure 6:
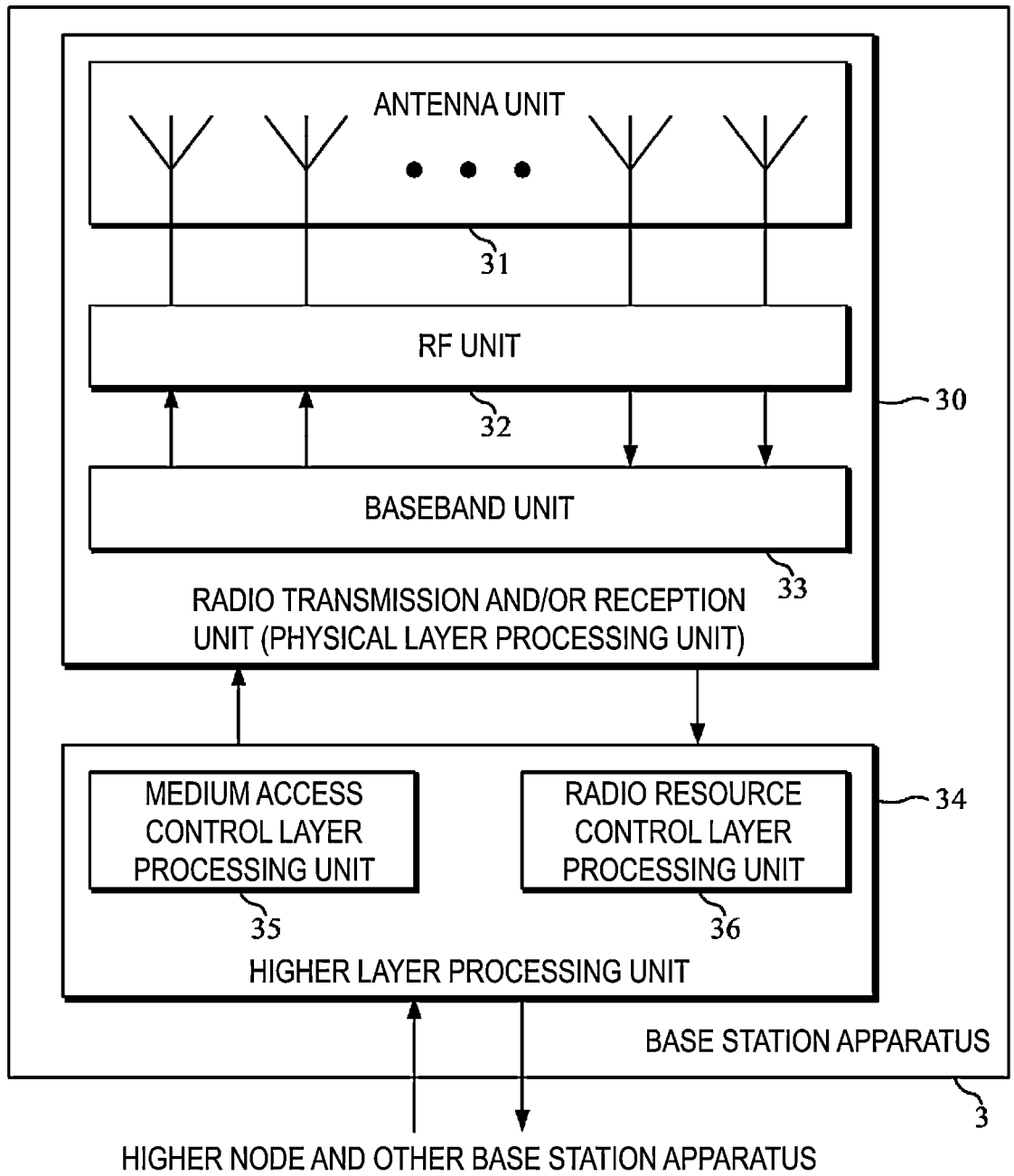
FIG. 6 is a schematic block diagram illustrating a configuration of a base station apparatus 3 according to an aspect of the present embodiment.

FIG. 6 is a schematic block diagram illustrating a configuration of the base station apparatus 3 according to an aspect of the present embodiment. As illustrated in the figure, the base station apparatus 3 includes a radio transmission and/or reception unit 30 and a higher layer processing unit 34. The radio transmission and/or reception unit 30 includes an antenna unit 31, an RF unit 32, and a baseband unit 33. The higher layer processing unit 34 includes a medium access control layer processing unit 35 and a radio resource control layer processing unit 36. The radio transmission and/or reception unit 30 may include at least a part or all of a transmission unit and a reception unit.

The higher layer processing unit 34 performs processing of an MAC layer, a PDCP layer, an RLC layer, and an RRC layer.

The medium access control layer processing unit 35 included in the higher layer processing unit 34 performs processing of the MAC layer.

The radio resource control layer processing unit 36 included in the higher layer processing unit 34 performs processing of the RRC layer. The radio resource control layer processing unit 36 generates, or acquires from a higher node, downlink data (transport block) mapped to a PDSCH, system information, an RRC message, an MAC CE, and the like, and outputs the data to the radio transmission and/or reception unit 30. The radio resource control layer processing unit 36 performs management of various pieces of configuration information/parameters of each of the terminal apparatuses 1. The radio resource control layer processing unit 36 may set various pieces of configuration information/parameters for each of the terminal apparatuses 1 through a higher layer signaling. Specifically, the radio resource control layer processing unit 36 transmits or broadcasts information indicating the various pieces of configuration information/parameters. Note that the configuration information may include information related to the processing or configurations of the physical channel, the physical signal (that is, the physical layer), the MAC layer, the PDCP layer, the RLC layer, and the RRC layer. The parameters may be higher layer parameters.

The functionality of the radio transmission and/or reception unit 30 is similar to the functionality of the radio transmission and/or reception unit 10, and description thereof will thus be omitted.

Each of the units denoted by the reference sign 10 to the reference sign 16 included in the terminal apparatus 1 may be configured as a circuit. Each of the units denoted by the reference sign 30 to the reference sign 36 included in the base station apparatus 3 may be configured as a circuit.

The terminal apparatus 1 may perform Carrier sense prior to transmission of a physical signal. Also, the base station apparatus 3 may perform carrier sense prior to transmission of a physical signal. The carrier sense may be to perform Energy detection on a Radio channel. Whether the physical signal can be transmitted may be provided based on the carrier sense performed prior to transmission of the physical signal. In a case that the amount of energy detected in carrier sense performed prior to transmission of a physical signal is greater than a prescribed threshold value, for example, the transmission of the physical channel may not be performed, or it may be determined that the transmission is not possible. Also, in a case that the amount of energy detected in the carrier sense performed prior to the transmission of the physical signal is smaller than the prescribed threshold value, the transmission of the physical channel may be performed, or it may be determined that the transmission is possible. Moreover, in a case that the amount of energy detected in the carrier sense performed prior to the transmission of the physical signal is equal to the prescribed threshold value, the transmission of the physical channel may be performed or may not be performed. In other words, in a case that the amount of energy detected in the carrier sense performed prior to the transmission of the physical signal is equal to the prescribed threshold value, it may be determined that the transmission is not possible, or it may be determined that the transmission is possible.

A procedure in which whether the transmission of the physical channel is possible based on the carrier sense is also referred to as Listen Before Talk (LBT). A situation in which the transmission of the physical signal is determined to be not possible as a result of the LBT is also referred to as a busy state or busy. For example, the busy state may be a state in which the amount of energy detected in the carrier sense is greater than the prescribed threshold value. In addition, the situation in which the transmission of the physical signal is determined to be possible as a result of the LBT is also referred to as an idle state or idle. For example, the idle state may be a state in which the amount of energy detected in the carrier sense is smaller than the prescribed threshold value.

In a certain component carrier, New Radio-Unlicensed (NR-U) may be applied. In a certain serving cell, NR-U may be applied. A fact that NR-U is applied in a certain component carrier (or a certain serving cell) may at least include a technique (framework, configuration) including a part or all of the following element A1 to element A6.

Element A1: In the certain component carrier (or the certain serving cell), the second SS burst set is configured Element A2: The base station apparatus 3 transmits the second SS/PBCH block in the certain component carrier (or the certain serving cell)

Element A3: The terminal apparatus 1 receives the second SS/PBCH block in the certain component carrier (or the certain serving cell)

Element A4: The base station apparatus 3 transmits the PDCCH in the second Type 0 PDCCH common search space set in the certain component carrier (or the certain serving cell)

Element A5: The terminal apparatus 1 receives the PDCCH in the second Type 0 PDCCH common search space set in the certain component carrier (or the certain serving cell)

Element A6: A higher layer parameter (for example, a field included in the MIB) related to NR-U indicates a first value (for example, 1)

In a certain component carrier, New Radio-Unlicensed (NR-U) need not be applied. In a certain serving cell, NR-U need not be applied. A fact that NR-U is not applied in a certain component carrier (or a certain serving cell) may at least include a technique (framework, configuration) including a part or all of the following element B1 to element B6.

Element B1: In the certain component carrier (or the certain serving cell), the first SS burst set is configured Element B2: The base station apparatus 3 transmits the first SS/PBCH block in the certain component carrier (or the certain serving cell)

Element B3: The terminal apparatus 1 receives the first SS/PBCH block in the certain component carrier (or the certain serving cell)

Element B4: The base station apparatus 3 transmits the PDCCH in the first Type 0 PDCCH common search space set in the certain component carrier (or the certain serving cell)

Element B5: The terminal apparatus 1 receives the PDCCH in the first Type 0 PDCCH common search space set in the certain component carrier (or the certain serving cell)

Element B6: A higher layer parameter (for example, a field included in the MIB) related to NR-U indicates a value (for example, 0) different from the first value The certain component carrier may be configured in a licensed band. The certain serving cell may be configured in a licensed band. Here, a fact that the certain component carrier (or the certain serving cell) is configured in a licensed band may at least include a part or all of the following configuration 1 to configuration 3.

Configuration 1: A higher layer parameter indicating operation in a licensed band for the certain component carrier (or the certain serving cell) is given, or a higher layer parameter indicating operation in an unlicensed band for the certain component carrier (or the certain serving cell) is not given Configuration 2: The certain component carrier (or the certain serving cell) is configured so as to operate in a licensed band, or the certain component carrier (or the certain serving cell) is not configured so as to operate in an unlicensed band Configuration 3: The certain component carrier (or the certain serving cell) is included in a licensed band, or the certain component carrier (or the certain serving cell) is not included in an unlicensed band The licensed band may be such a band that the radio station license is required for the terminal apparatus that operates (is expected to operate) in the licensed band. The licensed band may be a band in which only terminal apparatuses manufactured by an operator (business entity, business, organization, company) with radio station license are allowed to operate. The unlicensed band may be such a band that the channel access procedure prior to transmission of the physical signal is not required.

The unlicensed band may be such a band that the radio station license is not required for the terminal apparatus that operates (is expected to operate) in the unlicensed band. The unlicensed band may be such a band in which terminal apparatuses manufactured by a part or all of an operator with the radio station license and/or an operator without the radio station license are allowed to operate. The unlicensed band may be such a band that the channel access procedure prior to transmission of the physical signal is required.

Whether or not NR-U is applied to the certain component carrier (or the certain serving cell) may be determined based on whether or not at least the certain component carrier (or the certain serving cell) is configured for a band that can be operated in the unlicensed band (for example, a band that can be operated only in the unlicensed band). For example, a list of bands designed for NR or carrier aggregation of NR may be defined. For example, in a case that a certain band is included in a band in which one or multiple bands in the list can be operated in the unlicensed band (for example, a band that can be operated only in the unlicensed band), NR-U may be applied to the certain band. In a case that a certain band is not included in a band in which one or multiple bands in the list can be operated in the unlicensed band (for example, a band that can be operated only in the unlicensed band), NR-U need not be applied to the certain band, and normal NR (for example, NR of release 15, or NR other than NR-U of release 16) may be applied.

Whether or not NR-U is applied to the certain component carrier (or the certain serving cell) may be determined based on whether or not at least the component carrier (or the serving cell) is configured for a band in which NR-U can be operated (for example, a band that can be operated only in NR-U). For example, in a case that the list of bands designed for operation of NR or carrier aggregation of NR is defined, and one or multiple bands in the list is defined as a band in which NR-U can be operated (for example, a band in which only NR-U can be operated), NR-U is applied for a case that a band configured for the component carrier (or the serving cell) is one of the one or multiple bands, and for a case it is a band other than the one or multiple bands, NR-U is not applied, and normal NR (for example, NR of release 15, or NR other than NR-U of release 16) may be applied.

Whether or not NR-U is applied to the certain component carrier (or the certain serving cell) may be determined based on information included in the system information (for example, the Master Information Block (MIB, or the Physical Broadcast Channel (PBCH))). For example, in a case that the MIB includes information indicating whether or not NR-U is applied and the information indicates application of NR-U, NR-U may be applied to the serving cell corresponding to the MIB. In contrast, in a case that the information does not indicate application of NR-U, NR-U need not be applied to the serving cell corresponding to the MIB, and normal NR may be applied. Alternatively, the information may indicate whether or not operation is possible in the unlicensed band.

The certain component carrier may be configured in the unlicensed band. The certain serving cell may be configured in the unlicensed band. Here, a fact that the certain component carrier (or the certain serving cell) is configured in the unlicensed band may at least include a part or all of the following configuration 4 to configuration 6.

Configuration 4: A higher layer parameter indicating operation in the unlicensed band is given to the certain component carrier (or the certain serving cell)

Configuration 5: The certain component carrier (or the certain serving cell) is configured so as to operate in the unlicensed band Configuration 6: The certain component carrier (or the certain serving cell) is included in the unlicensed band The following description will be given based on the assumption that NR-U is applied or NR-U is not applied to the component carrier. Note that "NR-U is applied to the component carrier" may mean "NR-U is applied to the serving cell", and "NR-U is not applied to the component carrier" may mean "NR-U is not applied to the serving cell".

For example, in a case that NR-U is not applied to a certain component carrier, the terminal apparatus 1 may receive the first SS/PBCH block. In a case that NR-U is not applied to a certain component carrier, the terminal apparatus 1 may receive the first PDCCH in a first type 0 PDCCH common search space set. In a case that NR-U is not applied in a certain component carrier, the base station apparatus 3 may transmit the first SS/PBCH block. In a case that NR-U is not applied to a certain component carrier, the base station apparatus 3 may transmit the first PDCCH in the first type 0 PDCCH common search space set. The first SS/PBCH block may be received in one of the SS/PBCH block candidates included in the first SS burst set. The first SS/PBCH block may be transmitted in one of the SS/PBCH block candidates included in the first SS burst set.

The terminal apparatus 1 may multiplex uplink control information (UCI) to the PUCCH and transmit the PUCCH. The terminal apparatus 1 may multiplex the UCI to the PUSCH and transmit the PUSCH. The UCI may include at least one of downlink Channel State Information (CSI), a Scheduling Request (SR) indicating a request for a PUSCH resource, and Hybrid Automatic Repeat request ACKnowledgement (HARQ-ACK) information for downlink data (a Transport block, a Medium Access Control Protocol Data Unit (MAC PDU), a Downlink-Shared Channel (DL-SCH), a Physical Downlink Shared Channel (PDSCH)).

HARQ control for one transport block (TB) may be referred to as an HARQ process. The HARQ control is capable of parallel operation for multiple transport blocks (TBs). Each HARQ process may be associated with an HARQ process identifier.

A New Feedback Indicator (NFI) field may be a DCI field indicating whether or not the HARQ-ACK information including the HARQ-ACK bit corresponding to the transport block of the PDSCH is correctly detected. The NFI field may be a field indicating whether or not the HARQ-ACK bit stored in a recording medium such as a memory is to be erased (flushed).

For example, after the HARQ-ACK bit corresponding to the transport block included in the PDSCH scheduled by the DCI format is transmitted, the terminal apparatus 1 may store a value of an NFI bit corresponding to each PDSCH group indicated in the DCI format. For example, in a case that the terminal apparatus 1 receives the DCI format, the terminal apparatus 1 may store the value of the NFI bit corresponding to each PDSCH group indicated in the DCI format. Here, for the PDSCH, the received NFI bit may refer to an NFI bit that is indicated by the NFI field included in the DCI format used for scheduling of the PDSCH. For the PDSCH, the stored NFI bit may refer to an NFI bit that has already been stored in the terminal apparatus 1 before being detected by the DCI format used for scheduling of the PDSCH. For each PDSCH group, the initial value of the value of the stored NFI bit may be set to 0 in advance. The terminal apparatus 1 may compare the value of the received NFI bit and the value of the stored NFI bit, and determine whether or not the NFI bit corresponding to the PDSCH group is toggled. In a case that the values of the received NFI bit and the stored NFI bit are different, the terminal apparatus 1 may determine that the NFI bit is toggled. The terminal apparatus 1 may determine that the HARQ-ACK information corresponding to the PDSCH group for which the NFI bit (that is, the received NFI bit) is toggled is detected in the base station apparatus 3 in comparison to a value of a previously received NFI bit (that is, the stored NFI bit) for the PDSCH group. For example, in a case that the base station apparatus 3 detects the HARQ-ACK information corresponding to the PDSCH group, the base station apparatus 3 may toggle the NFI bit corresponding to the PDSCH group. In a case that the values of the received NFI bit and the stored NFI bit are the same, it may be determined that the NFI bit is not toggled. The terminal apparatus 1 may determine that the HARQ-ACK information corresponding to the PDSCH group for which the NFI bit (that is, the received NFI bit) is not toggled is not detected in the base station apparatus 3 in comparison to a value of a previously received NFI bit (that is, the stored NFI bit) for the PDSCH group. For example, in a case that the base station apparatus 3 does not detect the HARQ-ACK information corresponding to the PDSCH group, the base station apparatus 3 need not toggle the NFI bit corresponding to the PDSCH group. Here, "to toggle" means to switch to a different value.

The received NFI may include one or multiple received NFI bits. Each entry of the received NFI may be a received NFI bit corresponding to each PDSCH group. The stored NFI may include one or multiple stored NFI bits. Each entry of the stored NFI may be a stored NFI bit corresponding to each PDSCH group.

In a case that the terminal apparatus 1 generates the HARQ-ACK codebook corresponding to a certain PDSCH group, and the NFI bit is toggled in comparison to a value of a previously received NFI bit (that is, the stored NFI bit) for the PDSCH group, the terminal apparatus 1 may delete (need not include) the HARQ-ACK information already reported (HARQ-ACK information other than HARQ-ACK information not reported yet) from the HARQ-ACK codebook corresponding to the PDSCH group. In a case that there is a PDSCH that is detected and for which the HARQ-ACK information is not reported yet out of the PDSCH group, the terminal apparatus 1 need not delete (may include) the HARQ-ACK information corresponding to the PDSCH. In other words, the terminal apparatus 1 may multiplex the HARQ-ACK information corresponding to the PDSCH on the HARQ-ACK codebook described above. For one or more pieces of HARQ-ACK information corresponding to the PDSCH group for which the NFI bit is toggled, the terminal apparatus 1 may flush the HARQ-ACK information that is already reported, and need not flush the HARQ-ACK information that is not reported. Here, "to flush" means to bring the HARQ-ACK information to the initial value (for example, a NACK). In a case that the terminal apparatus 1 receives the NFI being toggled and then transmits the HARQ-ACK codebook corresponding to the PDSCH group for the NFI bit, the terminal apparatus 1 generates the HARQ-ACK codebook by using the HARQ-ACK information not being flushed (HARQ-ACK information not being reported) and transmits the HARQ-ACK codebook. In a case that the terminal apparatus 1 receives the NFI not being toggled and then transmits the HARQ-ACK codebook corresponding to the PDSCH group for the NFI bit, the terminal apparatus 1 generates the HARQ-ACK codebook by using the HARQ-ACK information not being flushed (HARQ-ACK information being reported and HARQ-ACK information not being reported) and transmits the HARQ-ACK codebook.

The terminal apparatus 1 may determine the HARQ-ACK codebook, based at least on whether or not the NFI bit is toggled. The terminal apparatus 1 may determine the HARQ-ACK codebook corresponding to a certain PDSCH group, based at least on whether or not the stored NFI bit and the received NFI bit corresponding to the certain PDSCH group are toggled.

A value of K1 (information or a parameter indicated by the timing indication field from the PDSCH to the HARQ feedback) indicated in the DCI format included in the PDCCH may be a numerical value (numerical), or may be a non-numerical value (non-numerical). Here, the value of the numerical value may indicate a value expressed in numbers, and for example, may be a value out of {0, 1, 2, . . . , 15}. The value of the non-numerical value may indicate a value other than a number, or may indicate that a numerical value is not indicated. The use of the value of K1 being a numerical value and the value of K1 being a non-numerical value will be described below. For example, the PDSCH scheduled using the DCI format is transmitted in the base station apparatus 3 in slot n, and is received in the terminal apparatus 1. In a case that the value of K1 indicated in the DCI format is a numerical value, the terminal apparatus 1 may transmit (report) the HARQ-ACK information corresponding to the PDSCH in slot n+K1 via the PUCCH or the PUSCH. In a case that the value of K1 indicated in the DCI format is a non-numerical value, the terminal apparatus 1 may defer reporting of the HARQ-ACK information corresponding to the PDSCH. In a case that the value of K1 being a non-numerical value is indicated in the DCI format including scheduling information of the PDSCH, the terminal apparatus 1 may defer reporting of the HARQ-ACK information corresponding to the PDSCH. For example, the terminal apparatus 1 may store the HARQ-ACK information in a recording medium such as a memory, and transmit (report) the HARQ-ACK information with the transmission of the HARQ-ACK information being triggered based at least on a DCI format other than the DCI format described above, without transmitting (reporting) the HARQ-ACK information via the following PUCCH or PUSCH.

The value of K1 being a non-numerical value may be included in a first higher layer parameter sequence. The first higher layer parameter may be a higher layer parameter dl-DataToUL-ACK. The first higher layer parameter may be a higher layer parameter different from the higher layer parameter dl-DataToUL-ACK. The value of K1 may be a value indicated by the timing indication field from the PDSCH to the HARQ feedback included in DCI format 1_0 or DCI format 1_1 out of the first higher layer parameter sequence. For example, in a case that it is assumed that the first higher layer parameter sequence is set to {0, 1, 2, 3, 4, 5, 15, value of non-numerical value} and the number of bits of the timing indication field from the PDSCH to the HARQ feedback is 3, the code point "000" of the timing indication field from the PDSCH to the HARQ feedback may indicate that the value of K1 is 0, the code point "001" may indicate that the value of K1 is 1, or the code point "111" may indicate that value of K1 is the value of the non-numerical value. For example, in a case that it is assumed that the first higher layer parameter sequence is set to {value of non-numerical value, 0, 1, 2, 3, 4, 5, 15} and the number of bits of the timing indication field from the PDSCH to the HARQ feedback is 3, the code point "000" of the timing indication field from the PDSCH to the HARQ feedback may indicate that the value of K1 is the value of the non-numerical value, the code point "001" may indicate that the value of K1 is 0, and the code point "111" may indicate that the value of K1 is 15.

For example, the timing indication field from the PDSCH to the HARQ feedback included in DCI format 1_0 need not indicate the value of the non-numerical value. For example, a certain code point of the timing indication field from the PDSCH to the HARQ feedback included in DCI format 1_0 may indicate the value of the non-numerical value. For example, the timing indication field from the PDSCH to the HARQ feedback included in DCI format 1_1 need not indicate the value of the non-numerical value. For example, a certain code point of the timing indication field from the PDSCH to the HARQ feedback included in DCI format 1_1 may indicate the value of the non-numerical value.

Figure 7:
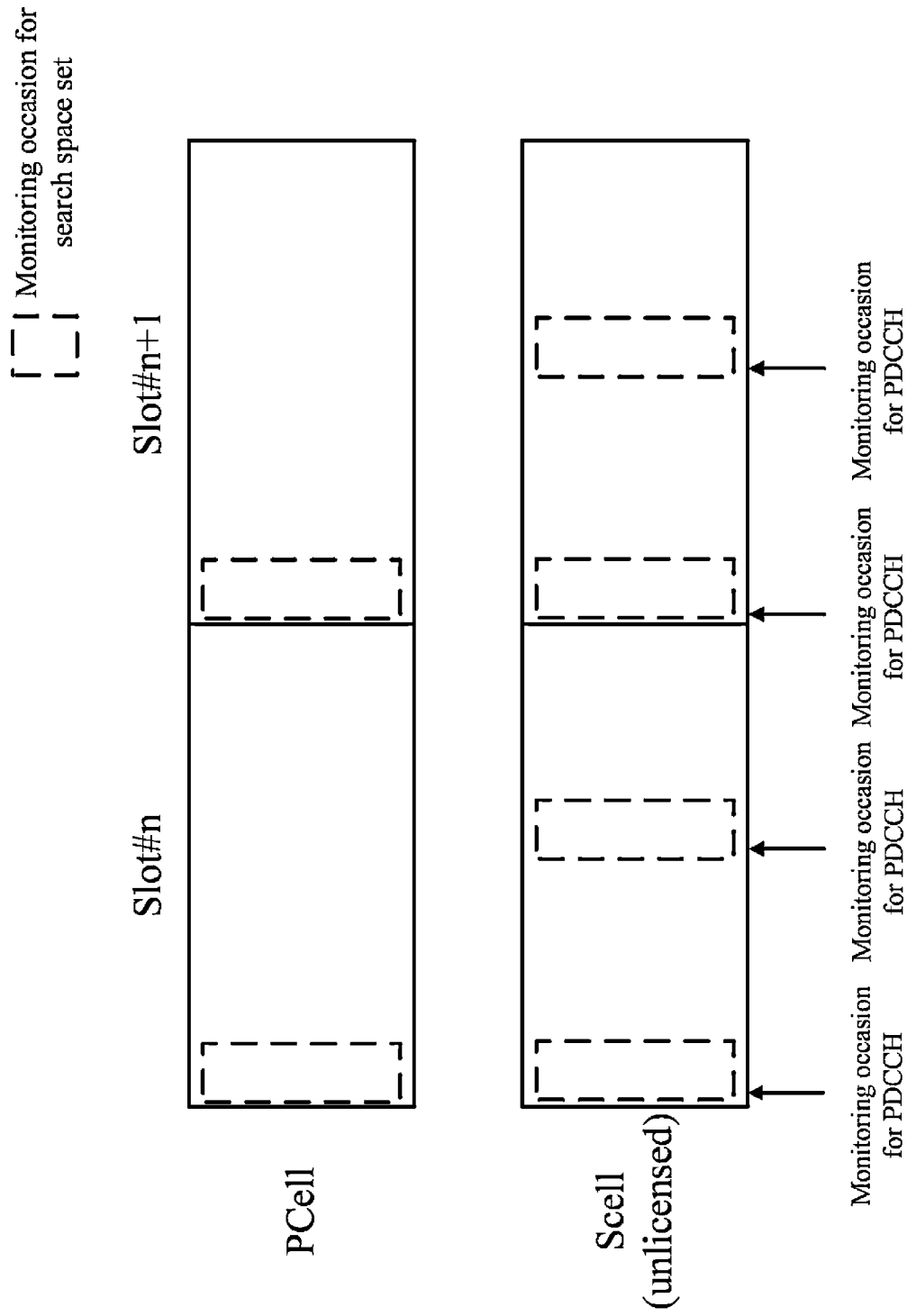
FIG. 7 is a diagram illustrating a correspondence example between the monitoring occasion for the search space set (Monitoring occasion for search space set) and the monitoring occasion for a PDCCH (Monitoring occasion for PDCCH) according to an aspect of the present embodiment.

FIG. 7 is a diagram illustrating a correspondence example between the monitoring occasion for the search space set (Monitoring occasion for search space set) and the monitoring occasion for the PDCCH (Monitoring occasion for PDCCH) according to an aspect of the present embodiment. In FIG. 7, the monitoring occasion for the search space set in the primary cell is the first OFDM symbol of the slot, and the monitoring occasion for the search space set in the secondary cell is the first OFDM symbol of the slot and the intermediate OFDM symbol (for example, OFDM symbol #7) of the slot. In FIG. 7, the monitoring occasion for the PDCCH corresponds to the first OFDM symbol of slot #n and the intermediate OFDM symbol of slot #n, and the first OFDM symbol of slot #n+1 and the intermediate OFDM symbol of slot #n+1. In other words, the monitoring occasion for the PDCCH may be defined as an occasion in which the monitoring occasion for the search space set is configured for at least one of one or multiple serving cells. The monitoring occasion for the PDCCH may correspond to an index of the OFDM symbol for which the monitoring occasion for the search space set is configured for at least one of one or multiple serving cells.

In the slot, the monitoring occasion for the search space set started from a certain OFDM symbol index may correspond to the monitoring occasion for the PDCCH started from the certain OFDM symbol index. The monitoring occasion for the PDCCH started from a certain OFDM symbol index may correspond to each monitoring occasion for the search space set started from the certain OFDM symbol index.

The terminal apparatus 1 may determine a set of monitoring occasions for the PDCCH for the HARQ-ACK information transmitted on the PUCCH mapped to the slot having index n (slot #n), based at least on some or all of a value of a timing K1 and a value of a slot offset K0. The set of monitoring occasions for the PDCCH for the HARQ-ACK information transmitted on the PUCCH mapped to the slot having index n is also referred to as a set of monitoring occasions for the PDCCH for the slot n (monitoring occasion for PDCCH for slot #n). Here, the set of monitoring occasions for the PDCCH includes M monitoring occasions for the PDCCH. For example, the slot offset K0 may be indicated based at least on a value of the time domain resource allocation field included in a downlink DCI format. The slot offset K0 is a value indicating the number of slots (difference of slots) from a slot including the last OFDM symbol to which the PDCCH including a DCI format including the time domain resource allocation field indicating the slot offset K0 is mapped to the first OFDM symbol of the PDSCH scheduled by the DCI format.

Figure 8:
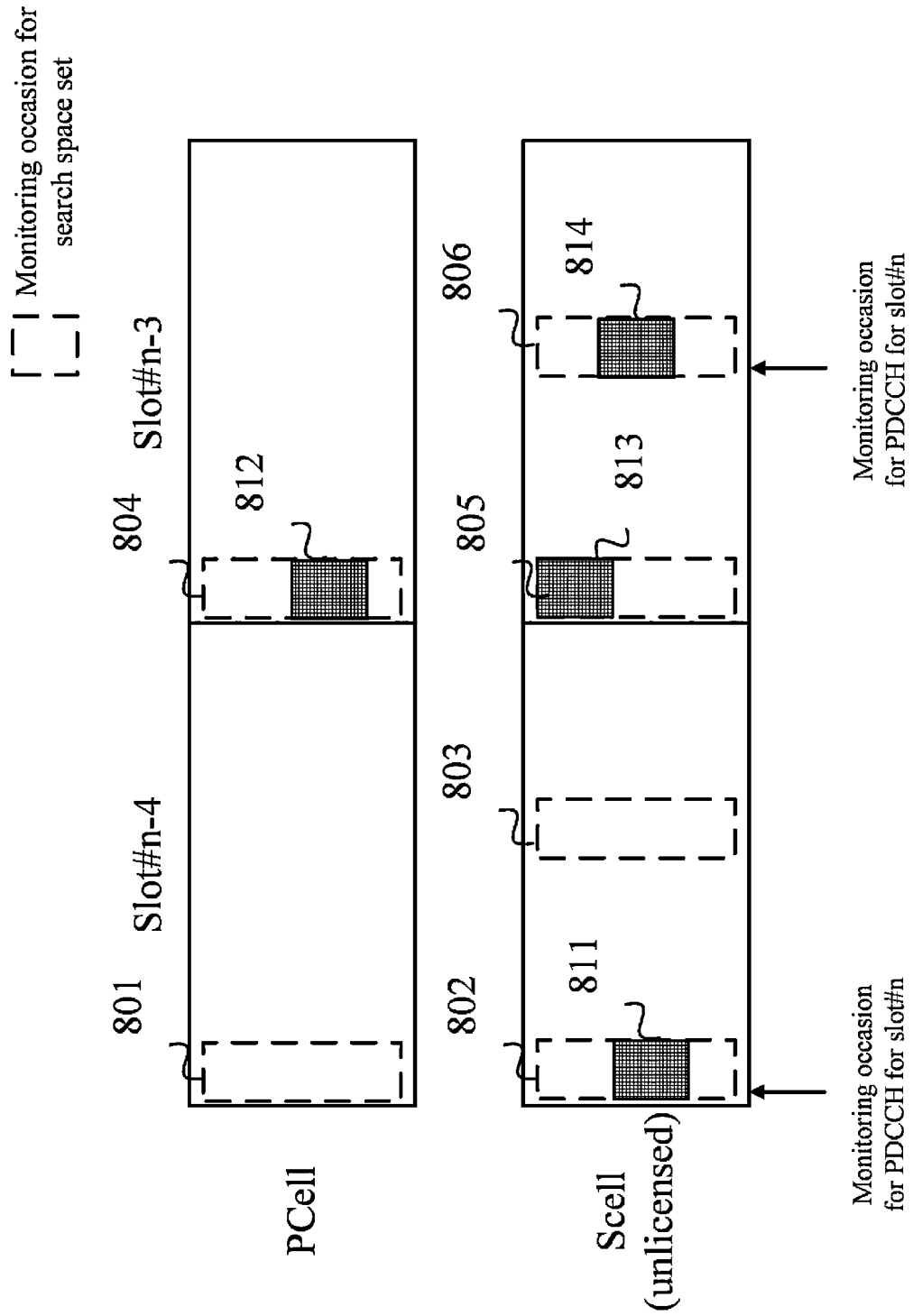
FIG. 8 is a diagram illustrating a configuration example of a set of monitoring occasions for the PDCCH for a slot n according to an aspect of the present embodiment.

FIG. 8 is a diagram illustrating a configuration example of the set of monitoring occasions for the PDCCH for the slot n according to an aspect of the present embodiment. In FIG. 8, the monitoring occasion for the search space set in the primary cell is the first OFDM symbol of a slot, and the monitoring occasion for the search space set in the secondary cell is the first OFDM symbol of a slot and the intermediate OFDM symbol (for example, OFDM symbol #7) of the slot. In FIG. 8, the monitoring occasion for the search space set in the primary cell includes 801 and 804, and the monitoring occasion for the search space set in the secondary cell includes 802, 803, 805, and 806. In FIG. 8, a DCI format 811 is detected in 802, a DCI format 812 is detected in 804, a DCI format 813 is detected in 805, and a DCI format 814 is detected in 806.

For example, in a case that transmission of the HARQ-ACK information in the slot n is indicated based at least on the timing K1 and the slot offset K0 indicated in the DCI format 811, the terminal apparatus 1 may determine the monitoring occasion for the PDCCH defined based at least on 801 as the PDCCH monitoring occasion for the slot n. For example, in a case that transmission of the HARQ-ACK information in the slot n is not indicated based at least on the timing K1 and the slot offset K0 indicated in the DCI format 812, and transmission of the HARQ-ACK information in the slot n is not indicated based at least on the timing K1 and the slot offset K0 indicated in the DCI format 813, the terminal apparatus 1 need not determine the monitoring occasion for the PDCCH defined based at least on some or all of 804 and 805 as the PDCCH monitoring occasion for the slot n. For example, in a case that transmission of the HARQ-ACK information in the slot n is indicated based at least on the timing K1 and the slot offset K0 indicated in the DCI format 814, the terminal apparatus 1 may determine the monitoring occasion for the PDCCH defined based at least on 806 as the PDCCH monitoring occasion for the slot n.

In other words, in a case that the DCI format detected in any one monitoring occasion for the search space set corresponding to a certain monitoring occasion for the PDCCH triggers transmission of the HARQ-ACK information in the slot n, the terminal apparatus 1 may determine the monitoring occasion for the PDCCH as the PDCCH monitoring occasion for the slot n. In a case that the DCI format detected in the monitoring occasion for the search space set corresponding to a certain monitoring occasion for the PDCCH does not trigger transmission of the HARQ-ACK information in the slot n, the terminal apparatus 1 need not determine the monitoring occasion for the PDCCH as the PDCCH monitoring occasion for the slot n. In a case that the DCI format is not detected in the monitoring occasion for the search space set corresponding to a certain monitoring occasion for the PDCCH, the terminal apparatus 1 need not determine the monitoring occasion for the PDCCH as the PDCCH monitoring occasion for the slot n.

The PUCCH resource used for transmission of the HARQ-ACK information in the slot n may be identified based at least on the PUCCH resource indication field that is included in the last DCI format among one or multiple DCI formats detected in the set of monitoring occasions for the PDCCH for the slot n. Here, each of the one or multiple DCI formats triggers transmission of the HARQ-ACK information in the slot n. The last DCI format may be a DCI format corresponding to the last index (largest index) among the DCI formats detected in the set of monitoring occasions for the PDCCH for the slot n. The index of the DCI format in the set of monitoring occasions for the PDCCH for the slot n is given in ascending order for the index of the serving cell in which the DCI format is detected, and is then given in ascending order for the index of the monitoring occasion for the PDCCH in which the DCI format is detected. The index of the monitoring occasion for the PDCCH is given in ascending order on the time axis.

A second higher layer parameter may include a higher layer parameter related to generation and reporting of the HARQ-ACK information. The first value in the second higher layer parameter may correspond to a conventional specification to which NR-U is not applied. The second value in the second higher layer parameter may correspond to a specification to which NR-U is applied. A higher layer parameter pdsch-HARQ-ACK-Codebook may be a higher layer parameter indicating a type of the HARQ-ACK codebook. The higher layer parameter pdsch-HARQ-ACK-Codebook may be given to any of semi-static and dynamic. The higher layer parameter pdsch-HARQ-ACK-Codebook may be given to the value of enhancedDynamic-r16. The value of enhancedDynamic-r16 in the higher layer parameter pdsch-HARQ-ACK-Codebook may correspond to application of NR-U. For the terminal apparatus 1, a part or all of the following configurations may be configured in a case that NR-U is applied. Here, the configuration of the higher layer parameter related to the HARQ-ACK codebook in a case that NR-U is applied may be referred to as an NR-U HARQ-ACK configuration.

Configuration 1: The second higher layer parameter is given

Configuration 2: The second higher layer parameter is given to the second value

Configuration 3: The higher layer parameter pdsch-HARQ-ACK-Codebook is given to enhancedDynamic-r16

In a case that the higher layer parameter pdsch-HARQ-ACK-Codebook is given to the value of semi-static, in a case of generation of the HARQ-ACK codebook, the size of the HARQ-ACK codebook may be determined semi-statically based at least on the higher layer parameter in advance. In other words, the size of the HARQ-ACK codebook need not depend on an actual detection state of the DCI format. In a case that the higher layer parameter pdsch-HARQ-ACK-Codebook is given to the value of dynamic, in a case of generation of the HARQ-ACK codebook, the size of the HARQ-ACK codebook may be dynamically determined based at least on the counter DAI and/or the total DAI indicated in the detected DCI format. In a case that the higher layer parameter pdsch-HARQ-ACK-Codebook is given to the value of semi-static or dynamic, the terminal apparatus 1 need not expect more than one PDSCH group. In a case that the higher layer parameter pdsch-HARQ-ACK-Codebook is given to the value of enhancedDynamic-r16, the HARQ-ACK codebook or the sub-codebook may be generated for each PDSCH group. In a case that the higher layer parameter pdsch-HARQ-ACK-Codebook is given to the value of enhancedDynamic-r16, the terminal apparatus 1 need not expect one or more than one PDSCH group.

In a case that the NR-U HARQ-ACK configuration is given, the terminal apparatus 1 may include, for the PDSCH group g associated with the scheduled PDSCH, the monitoring occasion for the PDCCH corresponding to the DCI format at least satisfying a part or all of condition A1, condition A2, and condition A3 in the set of monitoring occasions for the PDCCH for the slot n. For the PDSCH group g, the base station apparatus 3 may expect that the HARQ-ACK information having triggered transmission corresponds to the monitoring occasion for the PDCCH after the time point that the NFI bit corresponding to the PDSCH group g is finally toggled. In the terminal apparatus 1, the set of monitoring occasions for the PDCCH is determined based at least on the toggle state of the NFI bit indicated by the base station apparatus 3, so that ambiguity of recognition for a reception and/or transmission state of the HARQ-ACK information between the terminal apparatus 1 and the base station apparatus 3 is avoided. Therefore, efficient transmission and/or reception of the HARQ-ACK information can be implemented.

Condition A1: The HARQ-ACK information corresponding to the PDSCH scheduled by the DCI format is triggered to be transmitted via the PUCCH in the slot n Condition A2: The PDSCH group g is indicated by the PGI field included in the DCI format Condition A3: The DCI format is detected after the time point that an event in which the NFI bit corresponding to the PDSCH group g is toggled finally occurred Here, the event in which the NFI bit is toggled refers to an event in which the received NFI is toggled in comparison to the stored NFI.

Figure 9:
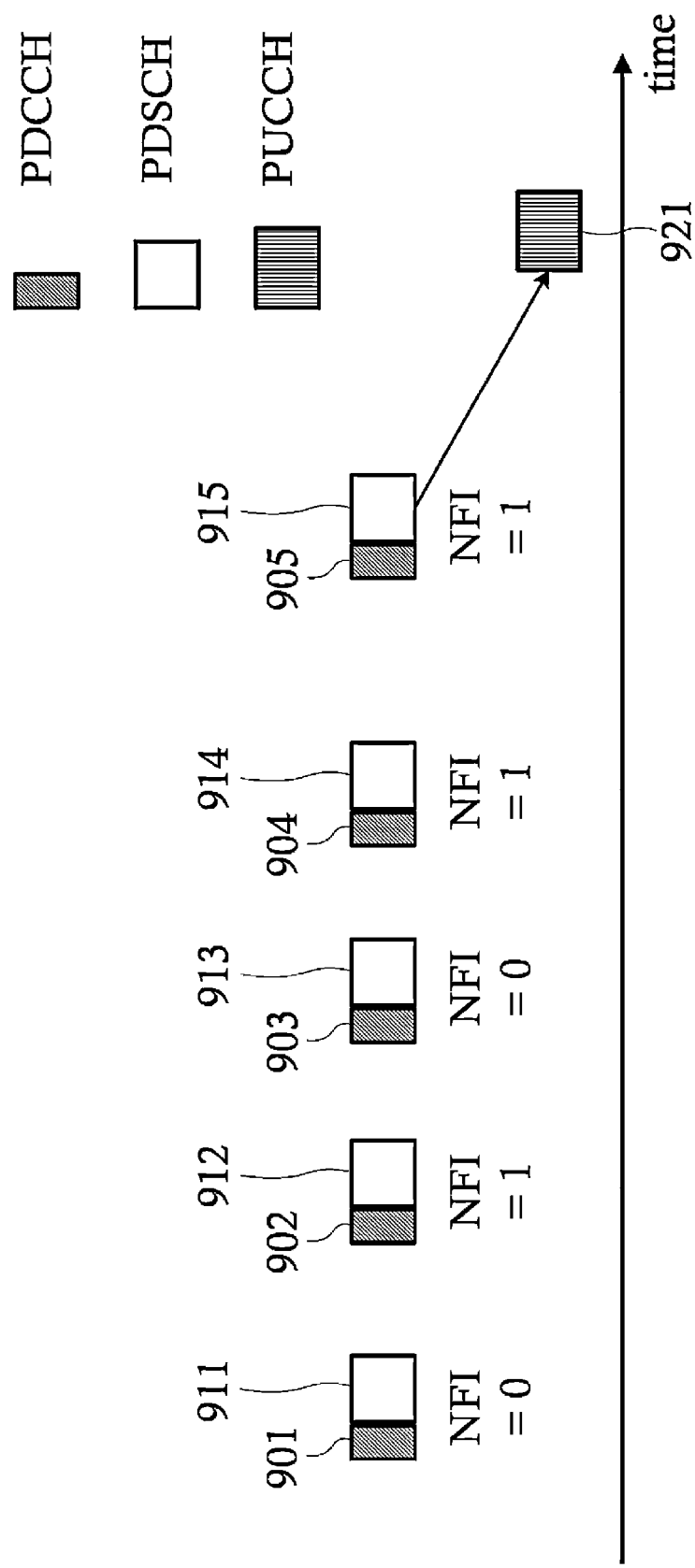
FIG. 9 is a diagram illustrating a configuration example of a set of monitoring occasions for the PDCCH for a slot n according to an aspect of the present embodiment.
Figure 10:
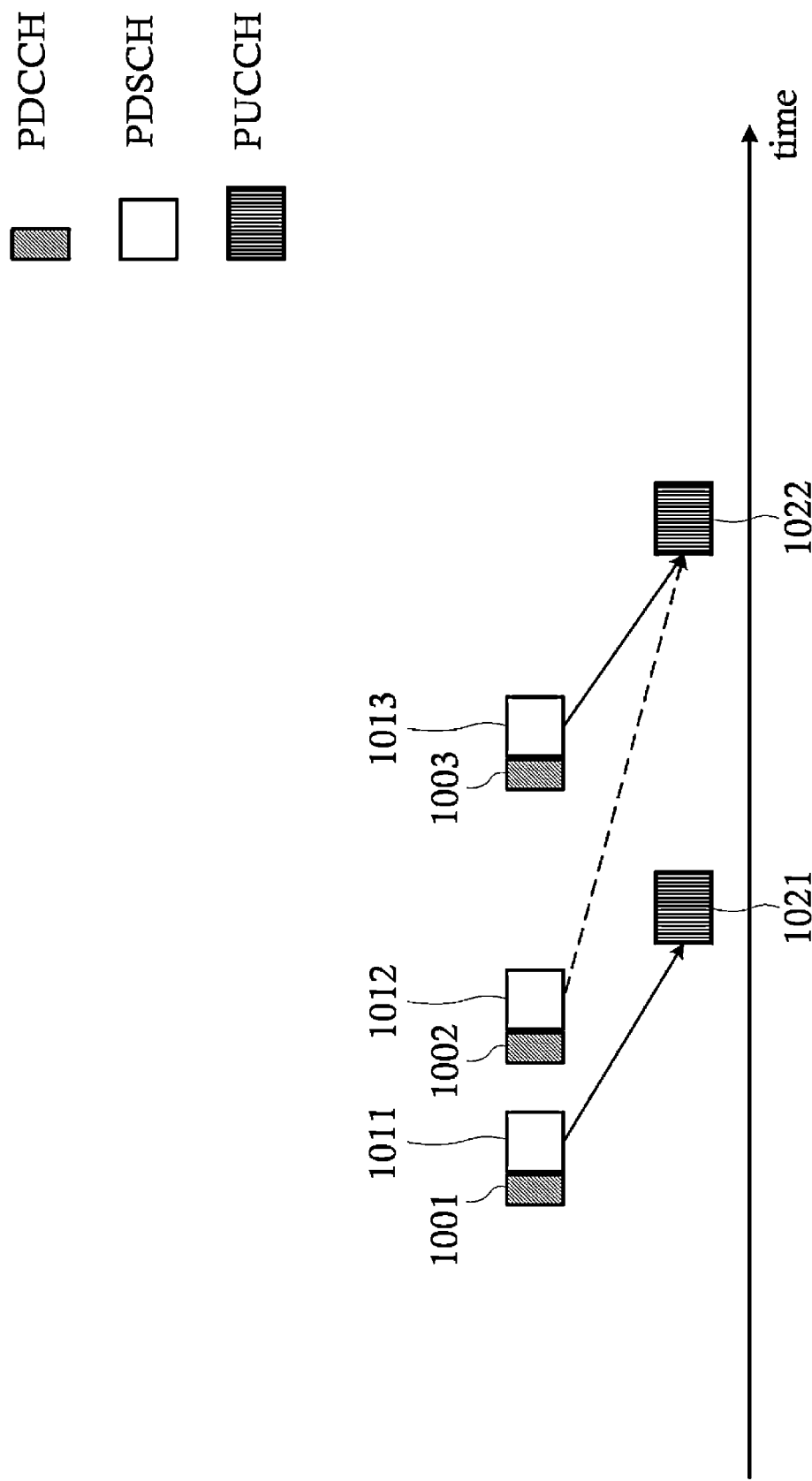
FIG. 10 is a diagram illustrating a configuration example of a set of monitoring occasions for the PDCCH for a slot n according to an aspect of the present embodiment.

FIG. 9 is a diagram illustrating a configuration example of the set of monitoring occasions for the PDCCH for the slot n according to an aspect of the present embodiment. FIG. 10 is a diagram illustrating a configuration example of the set of monitoring occasions for the PDCCH for the slot n according to an aspect of the present embodiment.

In FIG. 9 and FIG. 10, each of blocks hatched with diagonal lines represents a PDCCH, each of white blocks represents a PDSCH, and each of blocks hatched with vertical stripes represents a PUCCH. Here, an arrow pointing to any one of the PUCCHs from each of the PDSCHs indicates that initial transmission of the HARQ-ACK bit corresponding to the transport block included in the PDSCH corresponding to the start point of the arrow is carried out in the PUCCH corresponding to the end point of the arrow. Here, a solid arrow indicates that transmission of the PUCCH is triggered by the DCI format used for scheduling of the PDSCH (the timing K1 is a numerical value), and a dotted arrow indicates that transmission of the PUCCH is not triggered by the DCI format used for scheduling of the PDSCH (the timing K1 is a non-numerical value). In FIG. 9, the absence of the arrow pointing to the PUCCH from the PDSCH does not necessarily mean that transmission (initial transmission or the like) of the HARQ-ACK bit corresponding to the transport block included in the PDSCH is not triggered.

In FIG. 9 and FIG. 10, the terminal apparatus 1 assumes that the NR-U HARQ-ACK configuration is given.

In FIG. 9, the DCI format used for scheduling of a PDSCH 911 is included in a PDCCH 901, the DCI format used for scheduling of a PDSCH 912 is included in a PDCCH 902, the DCI format used for scheduling of a PDSCH 913 is included in a PDCCH 903, the DCI format used for scheduling of a PDSCH 914 is included in a PDCCH 904, and the DCI format used for scheduling of a PDSCH 915 is included in a PDCCH 905.

In FIG. 9, it is assumed that all of the PDSCHs are associated with the PDSCH group g. The terminal apparatus 1 transmits HARQ-ACK information 931 including the HARQ-ACK bit corresponding to the transport block included in the PDSCH 915 and the PDSCH 914 via a PUCCH 921 in the slot n. The terminal apparatus 1 may detect the PDCCH 901, and store the received NFI. In a case that the terminal apparatus 1 detects the PDCCH 902, the received NFI is indicated in the DCI format included in the PDCCH 902. By comparing the received NFI (having a value of 1) to the stored NFI (having a value of 0), the terminal apparatus 1 may determine that the NFI bit is toggled. After the determination, the terminal apparatus 1 may store the received NFI as the stored NFI. In a case that the terminal apparatus 1 detects the PDCCH 903, the received NFI is indicated in the DCI format included in the PDCCH 903. By comparing the received NFI (having a value of 0) to the stored NFI (having a value of 1), the terminal apparatus 1 may determine that the NFI bit is toggled. After the determination, the terminal apparatus 1 may store the received NFI as the stored NFI. In a case that the terminal apparatus 1 detects the PDCCH 904, the received NFI is indicated in the DCI format included in the PDCCH 904. By comparing the received NFI (having a value of 1) to the stored NFI (having a value of 0), the terminal apparatus 1 may determine that the NFI bit is toggled. After the determination, the terminal apparatus 1 may store the received NFI as the stored NFI. In a case that the terminal apparatus 1 detects the PDCCH 905, the received NFI is indicated in the DCI format included in the PDCCH 905. By comparing the received NFI (having a value of 1) to the stored NFI (having a value of 1), the terminal apparatus 1 may determine that the NFI bit is not toggled. After the determination, the terminal apparatus 1 may store the received NFI as the stored NFI. An event in which the NFI bit is toggled at the time point that the PDCCH 904 is detected is the last NFI bit toggle event before the PUCCH 921 is transmitted. For generation of the HARQ-ACK information 931, the terminal apparatus 1 may include the monitoring occasions for the PDCCH corresponding to the DCI format from the last NFI bit toggle event until detection of the last DCI format in the set of monitoring occasions for the PDCCH for the slot n. For example, the terminal apparatus 1 may include the monitoring occasions for the PDCCH corresponding to the PDCCH 904 and the PDCCH 905 in the set of monitoring occasions for the PDCCH for the slot n. The NFI bit toggle event is an event in which it is determined that the NFI bit is toggled. The NFI bit toggle event is triggered by the NFI bit included in the DCI format. In a case that the NFI bit (received NFI) included in the DCI format is toggled in comparison to the stored NFI, the NFI bit toggle event is triggered.

In other words, in a case that the NR-U HARQ-ACK configuration is given, the terminal apparatus 1 may determine, for the PDSCH group g associated with the scheduled PDSCH, the set of monitoring occasions for the PDCCH for the slot n, based at least on determination (specification, identification, recognition, judgement) of the last NFI bit toggle event. For example, for the PDSCH group g, the terminal apparatus 1 may include the monitoring occasions for the PDCCH at or after the timing of occurrence of the last NFI bit toggle event in the set of monitoring occasions for the PDCCH for the slot n. For example, for the PDSCH group g, the terminal apparatus 1 may include the monitoring occasion for the PDCCH at the timing of occurrence of the last NFI bit toggle event in the set of monitoring occasions for the PDCCH for the slot n. For example, for the PDSCH group g, the terminal apparatus 1 need not include the monitoring occasions for the PDCCH at or before the timing of occurrence of the last NFI bit toggle event in the set of monitoring occasions for the PDCCH for the slot n.

Further, for example, for the PDSCH group g, the terminal apparatus 1 may include the monitoring occasions for the PDCCH at or after the monitoring occasion for the PDCCH in which the DCI format related to the last NFI bit toggle event is detected in the set of monitoring occasions for the PDCCH for the slot n. For example, for the PDSCH group g, the terminal apparatus 1 may include the monitoring occasion for the PDCCH in which the DCI format related to the last NFI bit toggle event is detected in the set of monitoring occasions for the PDCCH for the slot n. For example, for the PDSCH group g, the terminal apparatus 1 need not include the monitoring occasions for the PDCCH at or before the monitoring occasion for the PDCCH in which the DCI format related to the last NFI bit toggle event is detected in the set of monitoring occasions for the PDCCH for the slot n. Here, the DCI format related to the last NFI bit toggle event is a DCI format that triggers occurrence of the last NFI bit toggle event.

In a case that the NR-U HARQ-ACK configuration is given, the terminal apparatus 1 may store the HARQ-ACK report state for reception of the PDSCH. The initial value of the HARQ-ACK report state may be set to N/A, null, or undefined in advance. After receiving the PDSCH, the terminal apparatus 1 may set the HARQ-ACK report state corresponding to reception of the PDSCH to not-reported. In a case that transmission of the HARQ-ACK bit corresponding to reception of the PDSCH is triggered in a certain uplink physical channel, the terminal apparatus 1 may set the HARQ-ACK report state to already reported. In a case that the terminal apparatus 1 detects that, for PDSCH reception with the HARQ-ACK report state being already reported, the NFI bit corresponding to the PDSCH group associated with the PDSCH is toggled in comparison to a previously received NFI bit, the terminal apparatus 1 may delete the HARQ-ACK report state (or set to the initial value). In a case that the terminal apparatus 1 detects that, for PDSCH reception with the HARQ-ACK report state being not-reported, the NFI bit corresponding to the PDSCH group associated with the PDSCH is toggled in comparison to a previously received NFI bit, the terminal apparatus 1 need not delete the HARQ-ACK report state (or set to the initial value). In other words, the terminal apparatus 1 may maintain the HARQ-ACK report state as not-reported. For the PDSCH group g associated with the scheduled PDSCH, the terminal apparatus 1 may include the monitoring occasion for the PDCCH corresponding to the DCI format satisfying a part or all of condition A1, condition A2, and condition B1 in the set of monitoring occasions for the PDCCH for the slot n. For the PDSCH group g, the base station apparatus 3 may expect that the HARQ-ACK information having triggered transmission corresponds to the monitoring occasion for the PDCCH in which the NFI corresponding to the PDSCH group g is not toggled (in the terminal apparatus 1, the HARQ-ACK report state has the initial value). In the terminal apparatus 1, the set of monitoring occasions for the PDCCH is determined based at least on the toggle state of the NFI bit indicated by the base station apparatus 3, so that ambiguity of recognition for a reception and/or transmission state of the HARQ-ACK information between the terminal apparatus 1 and the base station apparatus 3 is avoided. Therefore, efficient transmission and/or reception of the HARQ-ACK information can be implemented.

Condition B1: The HARQ-ACK report state corresponding to reception of the PDSCH scheduled by the DCI format is not-reported or already reported For the PDSCH group g associated with the scheduled PDSCH, the terminal apparatus 1 need not include the monitoring occasion for the PDCCH corresponding to the DCI format at least not satisfying at least one of condition A1, condition A2, or condition B1 in the set of monitoring occasions for the PDCCH for the slot n.

In FIG. 9, in a case that the PDCCH 901 is detected, the terminal apparatus 1 may set the HARQ-ACK report state corresponding to the PDSCH 911 to not-reported. After transmitting the HARQ-ACK information corresponding to the PDSCH 911, the terminal apparatus 1 may set the HARQ-ACK report state corresponding to the PDSCH 911 to already reported. In a case that the PDCCH 902 is detected, the terminal apparatus 1 may set the HARQ-ACK report state corresponding to the PDSCH 911 to the initial value in response to the NFI bit being toggled. In a case that the PDCCH 902 is detected, the terminal apparatus 1 may set the HARQ-ACK report state corresponding to the PDSCH 912 to not-reported. In a case that the PDCCH 903 is detected, the terminal apparatus 1 may set the HARQ-ACK report state corresponding to the PDSCH 912 to the initial value in response to the NFI bit being toggled. In a case that the PDCCH 903 is detected, the terminal apparatus 1 may set the HARQ-ACK report state corresponding to the PDSCH 913 to not-reported. In a case that the PDCCH 904 is detected, the terminal apparatus 1 may set the HARQ-ACK report state corresponding to the PDSCH 913 to the initial value in response to the NFI bit being toggled. In a case that the PDCCH 904 is detected, the terminal apparatus 1 may set the HARQ-ACK report state corresponding to the PDSCH 914 to not-reported. In a case that the PDCCH 905 is detected, the terminal apparatus 1 may maintain the HARQ-ACK report state corresponding to the PDSCH 914 as already reported in response to the NFI bit being not toggled. In a case that the PDCCH 905 is detected, the terminal apparatus 1 may set the HARQ-ACK report state corresponding to the PDSCH 915 to not-reported. Before the PUCCH 921 is transmitted, the HARQ-ACK report state corresponding to the PDSCH 911, the PDSCH 912, and the PDSCH 913 has the initial value, the HARQ-ACK report state corresponding to the PDSCH 914 is already reported, and the HARQ-ACK report state corresponding to the PDSCH 915 is not-reported. For generation of the HARQ-ACK information 931, the terminal apparatus 1 may include the monitoring occasion for the PDCCH corresponding to the PDSCH with the HARQ-ACK report state being not-reported or already reported in the set of monitoring occasions for the PDCCH for the slot n. For example, the terminal apparatus 1 may include the monitoring occasion for the PDCCH corresponding to the PDSCH 914 and the PDSCH 915 in the set of monitoring occasions for the PDCCH for the slot n. For example, the terminal apparatus 1 need not include the monitoring occasion for the PDCCH corresponding to the PDSCH 911, the PDSCH 912, and the PDSCH 913 in the set of monitoring occasions for the PDCCH for the slot n.

FIG. 11 is a diagram illustrating an example related to indication of a counter DAI and a total DAI according to an aspect of the present embodiment.

The following will describe the counter DAI and the total DAI. The DAI field is a general term for the first DAI field and the second DAI field. In the M monitoring occasions for the PDCCH (set of monitoring occasions for the PDCCH for the slot n), for a certain monitoring occasion for the PDCCH in a certain serving cell, a Counter DAI indicates a cumulative number (or may be a value at least related to the cumulative number) of the PDCCHs detected before the monitoring occasion for the PDCCH in the serving cell. The counter DAI may also be referred to as a C-DAI. The total DAI may indicate a cumulative number of the PDCCHs detected before a certain monitoring occasion for the PDCCH (or may be a value at least related to the cumulative number) in the M monitoring occasions for the PDCCH. The total DAI may be referred to as a Total Downlink Assignment Index (T-DAI).

For example, in a case that one serving cell is configured and the higher layer parameter pdsch-HARQ-ACK-Codebook is given to the value of dynamic, the number of bits of the second DAI field is 2, and the second DAI field may indicate the counter DAI. In other words, 2 bits of the second DAI field may be the counter DAI. In a case that more than one serving cell is configured and the higher layer parameter pdsch-HARQ-ACK-Codebook is given to the value of dynamic, the number of bits of the second DAI field is 4, the Most Important Bit (MSB) of the 2 bits of the second DAI field may indicate the counter DAI, and the Least Significant Bit (LSB) of the 2 bits of the second DAI field may indicate the total DAI. In other words, the MSB of the 2 bits of the second DAI field may be the counter DAI. In other words, the LSB of the 2 bits of the second DAI field may be the total DAI.

The DCI field indicating the total DAI corresponding to another group (for example, a PDSCH group (g+1) mod 2) for the PDSCH group g may be included in the DCI format used for scheduling of the PDSCH group g. The DCI field indicating the NFI corresponding to another group (for example, a PDSCH group (g+1) mod 2) for the PDSCH group g may be included in the DCI format used for scheduling of the PDSCH group g.

In FIG. 11, in a case that the second DAI field is 6 bits and NFI-TotalDAI-Included-r16 is set to enable, the MSB of 4 bits of the second DAI field may indicate the counter DAI and the total DAI corresponding to the PDSCH group (scheduled PDSCH group) scheduled by the DCI format including the second DAI field. The LSB of 2 bits of the second DAI field may indicate the total DAI corresponding to the PDSCH group (non-scheduled PDSCH group) different from the PDSCH group (scheduled PDSCH group) scheduled by the DCI format including the second DAI field. In a case that the second DAI field is 4 bits, the NFI-TotalDAI-Included-r16 is set to enable, and one serving cell is configured for the downlink, the MSB of 2 bits of the second DAI field may indicate the counter DAI corresponding to the PDSCH group (scheduled PDSCH group) scheduled by the DCI format including the second DAI field. The LSB of 2 bits of the second DAI field may indicate the total DAI corresponding to the PDSCH group (non-scheduled PDSCH group) different from the PDSCH group (scheduled PDSCH group) scheduled by the DCI format including the second DAI field.

In FIG. 10 and FIG. 11, indication of the total DAI using the second DAI field in retransmission of the HARQ-ACK codebook for a PDSCH 1011 via a PUCCH 1022 will be described. Here, a PDSCH 1011 scheduled by the PDCCH 1001 is associated with the PDSCH group g, and a PDSCH 1012 scheduled by a PDCCH 1002 and a PDSCH 1013 scheduled by a PDCCH 1003 are associated with a PDSCH group h different from the PDSCH group g. The following will describe generation of the HARQ-ACK information for the PDSCH group g. The terminal apparatus 1 receives the PDCCH 1001 including the DCI format for scheduling the PDSCH 1011, and transmits HARQ-ACK information 1031 including the HARQ-ACK bit corresponding to the PDSCH 1011 via a PUCCH 1021. Here, it is assumed that the PUCCH 1021 is not detected in the base station apparatus 3, and retransmission of the HARQ-ACK information 1031 is performed via a PUCCH 1022. The second DAI field for the PDSCH 1011 associated with the PDSCH group g may be included in the PDCCH 1002 associated with the PDSCH group h and/or the DCI format included in the PDCCH 1003. The counter DAI used for generation of the HARQ-ACK codebook for the PDSCH 1011 may be indicated by the DAI field included in the PDCCH 1001. The total DAI used for generation of the HARQ-ACK codebook for the PDSCH 1011 may be indicated by the DAI field included in the PDCCH 1001. The total DAI used for generation of the HARQ-ACK codebook for the PDSCH 1011 may be indicated by the second DAI field.

FIG. 12, FIG. 13, and FIG. 14 are diagrams illustrating an example of a procedure of configuration of a HARQ-ACK codebook (codebook of HARQ-ACK information) according to an aspect of the present embodiment. <AX> of FIG. 12, FIG. 13, and FIG. 14 is also referred to as step AX. In FIG. 12, FIG. 13, and FIG. 14, "A=B" may mean that A is set to B. In FIG. 12, FIG. 13, and FIG. 14, "A=B" may mean that B is input to A. The terminal apparatus 1 generates the HARQ-ACK codebook, based on the procedure illustrated in FIG. 12, FIG. 13, and FIG. 14. In a case that the NR-U HARQ-ACK configuration is given, the terminal apparatus 1 may generate the HARQ-ACK codebook, based on the procedure illustrated in FIG. 12, FIG. 13, and FIG. 14 for each PDSCH group, and in a case that multiple HARQ-ACK codebooks are generated, the terminal apparatus 1 may connect the multiple HARQ-ACK codebooks.

The HARQ-ACK codebook may be given based at least on some or all of step A1 to step A57.

The HARQ-ACK codebook corresponding to a certain PDSCH group may be given based at least on some or all of step A1 to step A57. The HARQ-ACK codebook corresponding to a certain PDSCH group may be given based on one or multiple HARQ-ACK bits corresponding to any one of one or multiple transport blocks included in any one of one or multiple PDSCHs included in the certain PDSCH group.

The HARQ-ACK codebook may be given based at least on some or all of a set of monitoring occasions for the PDCCH, a value of a UL DAI field, and/or a DAI field.

The HARQ-ACK codebook may be given based at least on some or all of a set of monitoring occasions for the PDCCH, a UL DAI, a counter DAI, and/or a total DAI.

In step A1, m=0 is set. m may indicate an index of the monitoring occasion for the PDCCH including DCI format 1_0 or DCI format 1_1.

In step A2, j may be set to 0.

In step A3, $V_{temp}$ may be set to 0.

In step A4, $V_{temp2}$ may be set to 0.

In step A5, $V_s = \varphi$ may be set. $\varphi$ indicates an empty set.

In step A6, $N^{DL}_{cells}$ may be set to the number of serving cells. The number of serving cells may be the number of serving cells configured for the terminal apparatus 1.

In step A7, M may be set to the number of monitoring occasions for the PDCCH.

In step A8, the first evaluation expression m<M is evaluated. In a case that the first evaluation expression is true, step A9 may be performed. In a case that the first evaluation expression is false, step A40 may be performed.

In step A9, a serving cell index c may be set to 0. The serving cell index may be given based at least on a higher layer parameter for each serving cell.

In step A10, the second evaluation expression $c<N^{DL}_{cells}$ is evaluated. In a case that the second evaluation expression is true, step A11 may be performed. In a case that the second evaluation expression is false, step A37 may be performed.

In step A11, in a case that a monitoring occasion m for the PDCCH in a serving cell c is before switching of an activated downlink BWP, step A12 may be performed. In step A11, in a case that there is switching of an activated uplink BWP in the PCell and switching of the activated downlink BWP is not triggered by DCI format 1_1, step A12 may be performed. In a case that neither of the two conditions described above is satisfied, step A13 may be performed.

In step A12, c may be set to c+1.

In step A13, step A14 may be performed.

In step A14, in a case that condition C1 or condition C2 is satisfied, step A15 may be performed.

Condition C1: There is a PDSCH related to the PDCCH in the monitoring occasion m for the PDCCH in the serving cell c Condition C2: There is a PDCCH indicating release of the SPS PDSCH in the serving cell c In step A15 the third evaluation expression $V^{DL}_{C\text{-}DAI, c, m} \leq V_{temp}$ is evaluated. In a case that the third evaluation expression is true, step A16 may be performed. In a case that the third evaluation expression is false, step A17 may be performed.

$V^{DL}_{C\text{-}DAI, c, m}$ is a value of a counter Downlink Assignment Index (DAI) given based at least on the PDCCH detected in the monitoring occasion m for the PDCCH in the serving cell c. In determination of the counter DAI, for the index of the PDCCH detected in the M monitoring occasions, the serving cell index c may be given first and the monitoring occasion m for the PDCCH may be given second. In other words, the index of the PDCCH detected in the M monitoring occasions for the PDCCH is first mapped in order of the serving cell index c, and may then be mapped in order of the monitoring occasion m for the PDCCH (serving cell index first, PDCCH monitoring occasion second mapping). The counter DAI may be referred to as a Counter Downlink Assignment Index (C-DAI).

In step A16, j may be set to j+1.

Step A17 may be a step indicating completion of operation based on the third evaluation expression in step A15.

In step A18, $V_{temp}$ may be set to $V^{DL}_{C\text{-}DAI, c, m}$.

In step A19, the fourth evaluation expression $V^{DL}_{T\text{-}DAI, m} = \varphi$ may be evaluated. In a case that the fourth evaluation expression is true, step A20 may be performed. In a case that the fourth evaluation expression is false, step A21 may be performed.

$V^{DL}_{T\text{-}DAI, m}$ may be a value of the total DAI given based at least on the PDCCH detected in the monitoring occasion m for the PDCCH in the serving cell c. The total DAI may indicate a cumulative number of the PDCCHs detected before the monitoring occasion m for the PDCCH (or may be a value at least related to the cumulative number) in the M monitoring occasions for the PDCCH. The total DAI may be referred to as a Total Downlink Assignment Index (T-DAI).

The HARQ-ACK codebook may be multiplexed on the PUSCH scheduled based at least on DCI format 0_1, and $V^{DL}_{T\text{-}DAI, m}$ may be replaced by $V^{UL}_{DAI}$ at least in a case that m=M−1.

In step A20, $V_{temp2}$ may be set to $V^{DL}_{C\text{-}DAI, c, m}$.

In step A21, step A23 may be performed.

In step A22, $V_{temp2}$ may be set to $V^{DL}_{T\text{-}DAI, m}$.

Step A23 may be a step indicating completion of operation based on the fourth evaluation expression in step A19.

In step A24, in a case that 1) harq-ACK-SpatialBundling-PUCCH is not provided, 2) the monitoring occasion m for the PDCCH is a monitoring occasion for the PDCCH including DCI format 1_0 or DCI format 1_1, 3) maxNrofCodeWordsScheduledByDCI is configured in at least one BWP in at least one serving cell for reception of two transport blocks, step A25 may be performed. maxNrofCodeWordsScheduledByDCI may be information indicating whether or not transmission of two transport blocks on PDSCH is supported.

In step A25, $o^{ACK}_a(8j+2(V^{DL}_{C\text{-}DAI, c, m}-1)+1)$ may be set to a value of the HARQ-ACK bit corresponding to the first transport block of the serving cell c. In a case that the value of the HARQ-ACK bit is 1, this may indicate an ACK. In a case that the value of the HARQ-ACK bit is 0, this may indicate a NACK. The first transport block of the serving cell c may be the first transport block included in the PDSCH scheduled using a DCI format that is included in the PDCCH detected in the monitoring occasion m for the PDCCH in the serving cell c. $o^{ACK}_a(X)$ is $o^{\sim ACK}_X$.

In step A26, $o^{ACK}_a(8j+2(V^{DL}_{C\text{-}DAI, c, m}-1)+1)$ may be set to a value of the HARQ-ACK bit corresponding to the second transport block of the serving cell c. The second transport block of the serving cell c may be the second transport block included in the PDSCH scheduled using a DCI format that is included in the PDCCH detected in the monitoring occasion m for the PDCCH in the serving cell c.

In a case that the PDSCH includes the first transport block, and the PDSCH does not include the second transport block, this may indicate that one transport block is included in the PDSCH.

In step A27, $V_s$ may be set to $V_s \cup \{8j+2(V^{DL}_{C\text{-}DAI, c, m}-1), 8j+2(V^{DL}_{C\text{-}DAI, c, m}-1)+1\}$. $Y \cup Z$ may indicate a union of set Y and set Z. {*} may be a set including *.

In step A28, in a case that 1) harq-ACK-SpatialBundling-PUCCH is provided, 2) the monitoring occasion m for the PDCCH is a monitoring occasion for the PDCCH including DCI format 1_1, and 3) maxNrofCodeWordsScheduledByDCI is configured in at least one BWP in at least one serving cell for reception of two transport blocks, step A29 may be performed.

In step A29, $o^{ACK}_a(4j+V^{DL}_{C\text{-}DAI, c, m}-1)$ may be set to a value given by a logical product (binary AND operation) of the first HARQ-ACK bit corresponding to the first transport block of the serving cell c and the second HARQ-ACK bit corresponding to the second transport block of the serving cell c.

In step A30, $V_s$ may be set to $V_s \cup \{4j+V^{DL}_{C\text{-}DAI, c, m}-1\}$.

In step A31, in a case that the condition of step A24 and the condition of step A28 are not satisfied, step A32 may be performed.

In step A32, $o^{ACK}_a(4j+V^{DL}_{C\text{-}DAI, c, m}-1)$ may be set to a value of the first HARQ-ACK bit corresponding to the first transport block of the serving cell c. In step A32, $o^{ACK}_a(4+V^{DL}_{C-DAI, c, m}-1)$ may be set to a value of the HARQ-ACK bit of the serving cell c.

In step A33, $V_s$ may be set to $V_s \cup \{4j+V^{DL}_{C-DAI, c, m}-1\}$.

Step A34 may be a step indicating completion of operation of step A24.

Step A35 may be a step indicating completion of operation of step A14.

In step A36, c may be set to c+1.

Step A37 may be a step indicating completion of operation of step A11.

In step A38, step A10 may be performed.

In step A39, m may be set to m+1.

In step A40, step A8 may be performed.

In step A41, the fifth evaluation expression $V_{temp2} < V_{temp}$ may be performed. In a case that the fifth evaluation expression is true, step A42 may be performed. In a case that the fifth evaluation expression is false, step A43 may be performed.

In step A42, j may be set to j+1.

Step A43 may be a step indicating completion of step A41.

In step A44, in a case that 1) harq-ACK-SpatialBundling-PUCCH is not provided, and 2) maxNrofCodeWordsScheduledByDCI is configured in at least one BWP in at least one serving cell, step A45 may be performed. In a case that neither of the two conditions described above is satisfied, step A46 may be performed.

In step A45, $O^{ACK}$ may be set to $2(4j+V_{temp2})$.

In step A46, step A47 may be performed.

In step A47, $O^{ACK}$ may be set to $4j+V_{temp2}$.

Step A48 may be a step indicating completion of operation of step A44.

In step A49, $o^{ACK}_a(i_N)$ may be set to a value of a NACK for $i_N$ that satisfies $i_N \in \{0, 1, \ldots, O^{ACK}-1\} ¥ V_s$. $V ¥ W$ may indicate a set obtained by eliminating elements included in set W from set V. $V ¥ W$ may be a set difference of V regarding W.

In step A50, c may be set to 0.

In step A51, the seventh evaluation expression $c < N^{DL}_{cells}$ is evaluated. In a case that the seventh evaluation expression is true, step A52 may be performed. In a case that the second evaluation expression is false, step A57 may be performed.

In step A52, in a case that a PDSCH (SPS PDSCH) scheduled using a configured grant in one or multiple slots in the M monitoring occasions for the PDCCH is configured to be received, and transmission of the SPS PDSCH is activated, step A53 may be performed.

In step A53, $O^{ACK}$ may be set to $O^{ACK}+1$. In step A53, $O^{ACK}$ may be set to $O^{ACK}+N_{SPS}$. $N_{SPS}$ may be the number of SPS PDSCHs configured to be received in M monitoring occasions 1001 for the PDCCH.

In step A54, $o^{ACK}(o^{ACK}-1)$ may be set to a value of the HARQ-ACK bit corresponding to the transport block included in the SPS PDSCH. In step A55, $o^{ACK}(o^{ACK}-i_{SPS})$ may be set to a value of the HARQ-ACK bit corresponding to the transport block included in the SPS PDSCH. $i_{SPS}$ may satisfy a condition of $i_{SPS} \in \{0, 1, \ldots, N_{SPS}-1\}$. In step A55, $o^{ACK}(o^{ACK}-1)$ may be set to a value given by a logical product of the HARQ-ACK bits corresponding to the transport blocks included in each of one or multiple SPS PDSCHs configured to be received in M monitoring occasions for the PDCCH.

Step A55 may be a step indicating completion of operation of step A52.

In step A56, c may be set to c+1.

Step A57 may be a step indicating completion of operation of step A51.

The first evaluation expression to the seventh evaluation expression are each also referred to as an evaluation expression. In a case that an evaluation expression is true, this may indicate that the evaluation expression is satisfied. In a case that the evaluation expression is false, this may indicate that the evaluation expression is not true. In a case that the evaluation expression is false, this may indicate that the evaluation expression is not satisfied.

$O^{ACK}$ is the size of the HARQ-ACK codebook (for example, the number of bits included in the HARQ-ACK codebook). $O^{ACK}$ may correspond to each PDSCH group. $O^{ACK}$ is the number of bits of the UCI corresponding to the HARQ-ACK information multiplexed on the PUCCH or the PUSCH. $O_{ACK}$ may be given by $O^{ACK}$.

Vtemp may be defined as a remainder obtained by dividing the size $O^{ACK}$ of the HARQ-ACK codebook by a certain number (for example, 4). In other words, $V_{temp}$ may be expressed as $V_{temp} = \mod(O^{ACK}, 4)$. $V_{temp}$ may be defined as a remainder obtained by dividing a value obtained by subtracting the number of HARQ-ACK bits corresponding to the SPS PDSCH of the size $O^{ACK}$ of the HARQ-ACK codebook by the certain number. j may be defined as a quotient obtained by dividing the size $O^{ACK}$ of the HARQ-ACK codebook by a certain number (for example, 4). In other words, $V_{temp}$ may expressed as $V_{temp} = \mathrm{floor}(O^{ACK}, 4)$. $V_{temp}$ may be defined as a quotient obtained by dividing a value obtained by subtracting the number of HARQ-ACK bits corresponding to the SPS PDSCH of the size $O^{ACK}$ of the HARQ-ACK codebook by the certain number.

A PUCCH transmission occasion may be a transmission occasion in which transmission of the PUCCH for reporting the HARQ-ACK information for the PDSCH is attempted. The PUCCH transmission occasion may be a transmission occasion in which transmission of the PUCCH used by the terminal apparatus 1 to report the HARQ-ACK information for the PDSCH is attempted. The PUCCH transmission occasion of the PDSCH may be indicated based at least on a timing K1 indicated in the DCI format for scheduling the PDSCH. The terminal apparatus 1 may transmit the PUCCH in the PUCCH transmission occasion, depending on results of the LBT. The terminal apparatus 1 may transmit the PUCCH in the PUCCH transmission occasion in a case that the terminal apparatus 1 determines an Idle state as the results of the LBT. The terminal apparatus 1 need not transmit the PUCCH in the PUCCH transmission occasion, depending on results of the LBT. The terminal apparatus 1 need not transmit the PUCCH in the PUCCH transmission occasion in a case that the terminal apparatus 1 determines a Busy state as the results of the LBT.

The PUCCH transmission occasion may correspond to one PUCCH resource. The one PUCCH resource may be a PUCCH resource indicated in the DCI format for scheduling the PDSCH. Here, a slot to which the PUCCH transmission occasion is mapped may be indicated based at least on the timing K1 indicated in the DCI format. In a case that the one PUCCH resource collides with the PUSCH in the time domain, the HARQ-ACK corresponding to the PDSCH may be transmitted on the PUSCH. Also in a case that the one PUCCH resource collides with the PUSCH in the time domain, the PUCCH transmission occasion corresponding to the one PUCCH resource may be valid.

g may be a value of the PGI field included in the DCI format. In a case that the PGI field is not included in the DCI format for scheduling the PDSCH, the terminal apparatus 1 may set g to 0. For the PDSCH group g, the PDSCH group (g+1) mod 2 may be referred to as another group (non-scheduled PDSCH group). For the PDSCH group (g+1) mod 2, the PDSCH group g may be referred to as another group (non-scheduled PDSCH group). i (g) may be a PUCCH transmission occasion for multiplexing (reporting, transmitting) the HARQ-ACK information. h (g) may be a value of a first NFI field included in the DCI format indicating g as the PGI. The first NFI field may correspond to the PDSCH group g. $h^{(g+1) mod\ 2}(g)$ may be indicated by a second NFI field included in the DCI format indicating g as the PGI. $h^{(g+1) mod\ 2}(g)$ may be a value of the second NFI field included in the DCI format indicating g as the PGI. The second NFI field may correspond to another group (for example, the PDSCH group (g+1) mod 2). Here, of the NFI field of 2 bits, the MSB of 1 bit may correspond to the first NFI field, and the LSB of 1 bit may correspond to the second NFI field. Of the NFI field of 2 bits, the LSB of 1 bit may correspond to the first NFI field, and the MSB of 1 bit may correspond to the second NFI field. $V_{DAI}^{(g+1) mod\ 2}$ may be indicated by the second DAI field included in the DCI format indicating g as the PGI. $V_{DAI}^{(g+1) mod\ 2}$ may be a value of the LSB of 2 bits of the second DAI field included in the DCI format indicating g as the PGI. Here, the LSB of 2 bits may be referred to as a total DAI field corresponding to the PDSCH group (g+1) mod 2. q may be a value of the NRPG field. For example, q may be a value of the NRPG field included in the DCI format indicating g as the PGI.

Figure 15:
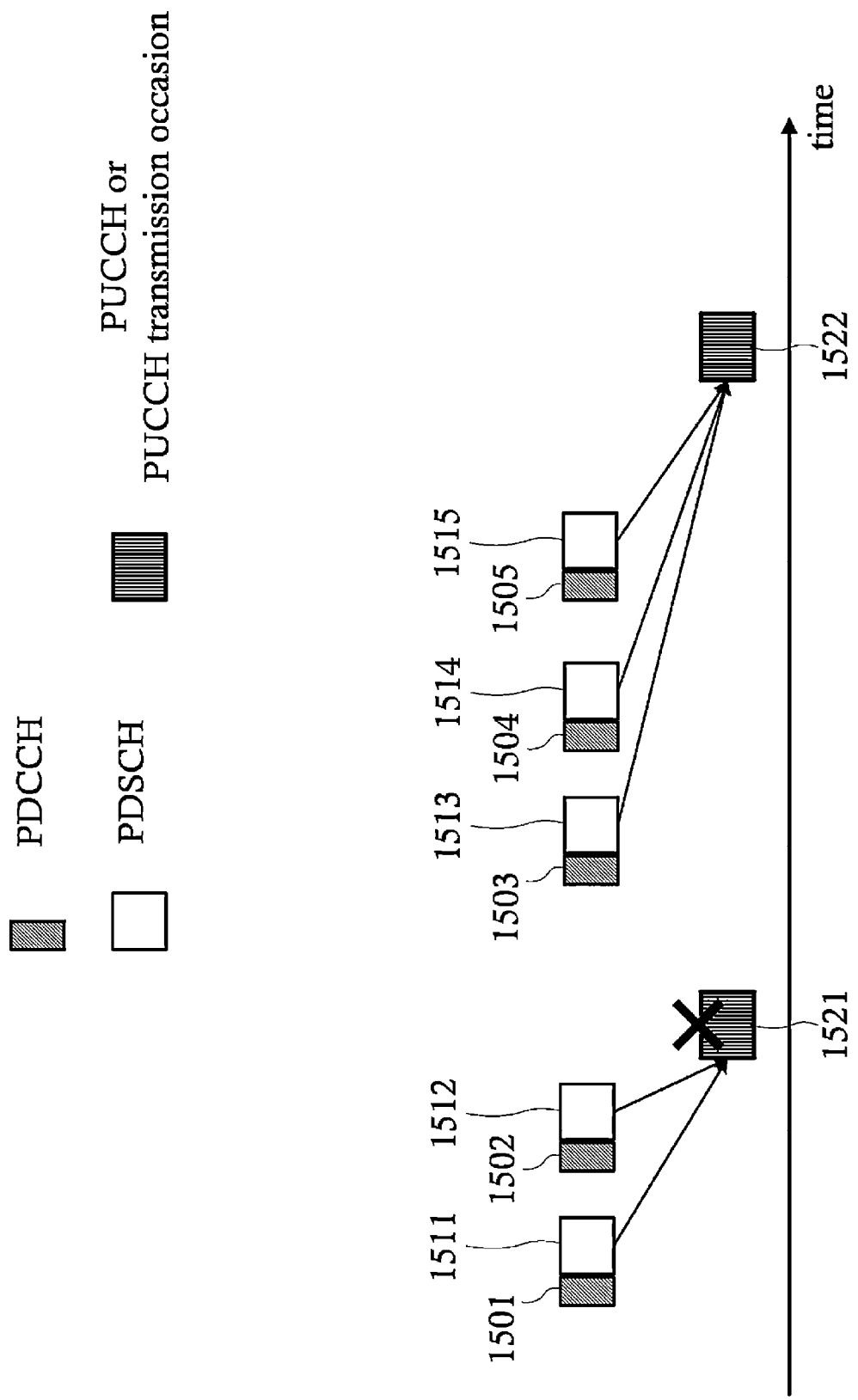
FIG. 15 is a diagram illustrating an example of generation of HARQ-ACK information according to an aspect of the present embodiment.

FIG. 15 is a diagram illustrating an example of generation of the HARQ-ACK information.

Figure 16:
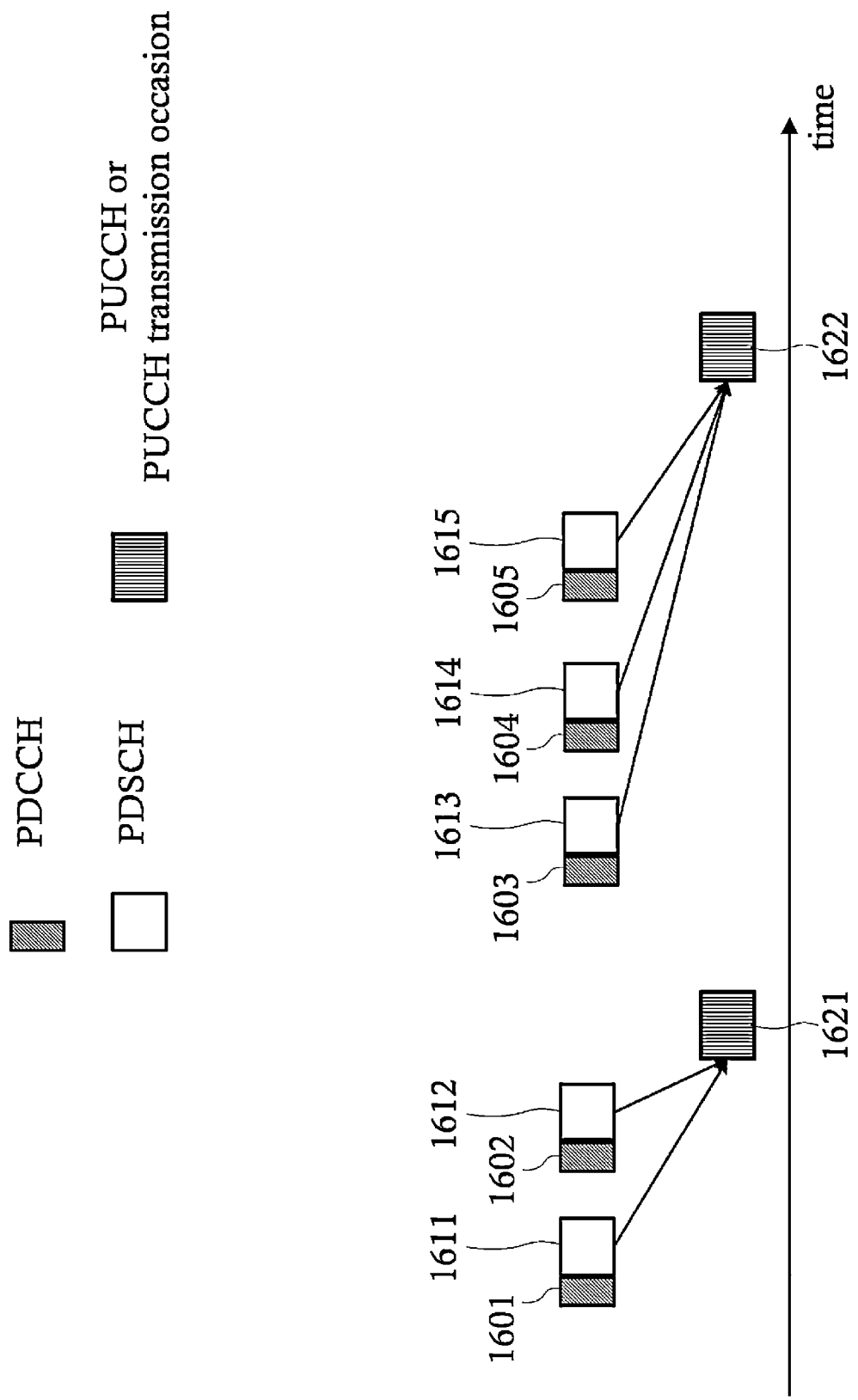
FIG. 16 is a diagram illustrating an example of generation of HARQ-ACK information according to an aspect of the present embodiment.

FIG. 16 is a diagram illustrating an example of generation of the HARQ-ACK information.

In FIG. 15 and FIG. 16, each of blocks hatched with diagonal lines represents a PDCCH, each of white blocks represents a PDSCH, and each of blocks hatched with vertical stripes represents a PUCCH or a PUCCH transmission occasion. An arrow pointing to any one of the PUCCHs or the PUCCH transmission occasions from each of the PDSCHs indicates that initial transmission of the HARQ-ACK bit corresponding to the transport block included in the PDSCH corresponding to the start point of the arrow is carried out in the PUCCH or the PUCCH transmission occasion corresponding to the end point of the arrow. Here, a solid arrow indicates that transmission of the PUCCH or PUCCH transmission in the PUCCH transmission occasion is triggered by the DCI format used for scheduling of the PDSCH (the timing K1 is a numerical value). In FIG. 15, it is assumed that the terminal apparatus 1 is given the NR-U HARQ-ACK configuration.

As illustrated in FIG. 15 and FIG. 16, the PUCCH transmission occasion may be defined as a transmission occasion of the PUCCH that is configured in a slot indicated by the PDSCH-to-HARQ feedback timing indicator field included in one or multiple DCI formats detected in the set of monitoring occasions for the PDCCH corresponding to the PUCCH transmission occasion. In other words, the PUCCH transmission occasion in the slot n may be given by one or multiple DCI formats detected in the set of monitoring occasions for the PDCCH for the slot n.

In FIG. 15, a slot to which a PUCCH 1521 is mapped may be indicated by the PDSCH-to-HARQ feedback timing indicator field included in each of a PDCCH 1501 and a PDCCH 1502. A slot to which a PUCCH 1522 is mapped may be indicated by the PDSCH-to-HARQ feedback timing indicator field included in each of a PDCCH 1503 to a PDCCH 1505. The slot to which the PUCCH 1522 is mapped may be indicated by the PDSCH-to-HARQ feedback timing indicator field included in the PDCCH 1505.

In FIG. 15, it is assumed that a PDSCH 1511 to a PDSCH 1514 are associated with the PDSCH group (g+1) mod 2 (in other words, the same PDSCH group). It is assumed that a PDSCH 1515 is associated with the PDSCH group g. In the DCI format included in the PDCCH 1501 used for scheduling of the PDSCH 1511, 0 is indicated as the NFI bit corresponding to the PDSCH group (g+1) mod 2, 1 is indicated as the counter DAI, and 1 is indicated as the total DAI. In the DCI format included in the PDCCH 1502 used for scheduling of the PDSCH 1512, 0 is indicated as the NFI bit corresponding to the PDSCH group (g+1) mod 2, 2 is indicated as the counter DAI, and 2 is indicated as the total DAI. The terminal apparatus 1 reports the HARQ-ACK information corresponding to the PDSCH 1511 and the PDSCH 1512 via the PUCCH 1521. Here, it is assumed that the PUCCH 1521 is not correctly detected in the base station apparatus 3. In the DCI format included in the PDCCH 1503 used for scheduling of the PDSCH 1513, 0 is indicated as the NFI bit corresponding to the PDSCH group (g+1) mod 2, 3 is indicated as the counter DAI, and 3 is indicated as the total DAI. In other words, the NFI bit corresponding to the PDSCH group (g+1) mod 2 is not toggled. In the DCI format included in the PDCCH 1504 used for scheduling of the PDSCH 1514, 0 is indicated as the NFI bit corresponding to the PDSCH group (g+1) mod 2, 4 is indicated as the counter DAI, and 4 is indicated as the total DAI. In the DCI format included in the PDCCH 1505 used for scheduling of the PDSCH 1515, 0 is indicated as the NFI bit corresponding to the PDSCH group g, 1 is indicated as the counter DAI, and 1 is indicated as the total DAI. In the DCI format included in the PDCCH 1505, 0 is indicated as the NFI bit (for example, $h^{(g+1) mod\ 2}(g)$) corresponding to another group (for example, the PDSCH group (g+1) mod 2), and 2 is indicated as the total DAI (for example, $V_{DAI}^{(g+1) mod\ 2}$) corresponding to another group (for example, the PDSCH group (g+1) mod 2). The terminal apparatus 1 may generate first HARQ-ACK information for the PDSCH group g (for example, the PDSCH 1515). The terminal apparatus 1 may generate second HARQ-ACK information for the PDSCH group (g+1) mod 2 (for example, the PDSCH 1511 to the PDSCH 1514). The terminal apparatus 1 may report the HARQ-ACK information including the first HARQ-ACK information and/or the second HARQ-ACK information via the PDCCH 1522.

In FIG. 15, the PUCCH 1522 may be i (g). $h^{(g+1) mod\ 2}(g)$ may be indicated by the PDCCH 1515, and be the NFI bit corresponding to the PDSCH group (g+1) mod 2. For example, $h^{(g+1) mod\ 2}(g)$ may be indicated by the second NFI field included in the DCI format included in the PDCCH 1515. h ((g+1) mod 2) may be the NFI bit corresponding to the PDSCH group (g+1) mod 2. h ((g+1) mod 2) may be indicated by the last detected PDCCH among the PDCCH 1501 to the PDCCH 1504. For example, h ((g+1) mod 2) may be indicated by the first NFI field included in the DCI format included in the PDCCH 1504. In a case that $h^{(g+1) mod\ 2}(g)$ is null (the DCI format indicating $h^{(g+1) mod\ 2}(g)$ is not detected), or $h^{(g+1) mod\ 2}(g)$ is equal to h ((g+1) mod 2), the terminal apparatus 1 may generate PUCCH transmission occasion second HARQ-ACK information through the procedure illustrated in FIG. 12, FIG. 13, and FIG. 14. Here, the second HARQ-ACK information may correspond to detection of the DCI format indicating (g+1) mod 2 as the PGI. Here, at least one DCI format of the DCI formats may indicate (g+1) mod 2 as the PGI. Here, in the procedure illustrated in FIG. 12, FIG. 13, and FIG. 14, the first monitoring occasion (m=0) for the PDCCH in the set of monitoring occasions for the PDCCH may be the monitoring occasion for the PDCCH corresponding to detection of the DCI format indicating h ((g+1) mod 2) as a first NFI bit after the terminal apparatus 1 detects the first NFI bit different from h ((g+1) mod 2). Here, in a case that $V_{DAI}^{(g+1)mod\ 2}$ is not null (the DCI format indicating $V_{DAI}^{(g+1)mod\ 2}$ is detected), in the procedure illustrated in FIG. 12, FIG. 13, and FIG. 14, $V_{temp2}$ may be set to $V_{DAI}^{(g+1)mod\ 2}$ after the loop of c and m ends. For example, the terminal apparatus 1 may report the HARQ-ACK information including the first HARQ-ACK information of 1 bit and/or the second HARQ-ACK information of 4 bits via i (g) (for example, the PDCCH 1522).

In FIG. 16, a slot to which a PUCCH 1621 is mapped may be indicated by the PDSCH-to-HARQ feedback timing indicator field included in each of a PDCCH 1601 and a PDCCH 1602. A slot to which a PUCCH 1622 is mapped may be indicated by the PDSCH-to-HARQ feedback timing indicator field included in each of a PDCCH 1603 to a PDCCH 1605. The slot to which the PUCCH 1622 is mapped may be indicated by the PDSCH-to-HARQ feedback timing indicator field included in the PDCCH 1605.

In FIG. 16, it is assumed that a PDSCH 1611 to a PDSCH 1614 are associated with the PDSCH group (g+1) mod 2 (in other words, the same PDSCH group). It is assumed that a PDSCH 1615 is associated with the PDSCH group g. In the DCI format included in the PDCCH 1601 used for scheduling of the PDSCH 1611, 0 is indicated as the NFI bit corresponding to the PDSCH group (g+1) mod 2, 1 is indicated as the counter DAI, and 1 is indicated as the total DAI. In the DCI format included in the PDCCH 1602 used for scheduling of the PDSCH 1612, 0 is indicated as the NFI bit corresponding to the PDSCH group (g+1) mod 2, 2 is indicated as the counter DAI, and 2 is indicated as the total DAI. The terminal apparatus 1 reports the HARQ-ACK information corresponding to the PDSCH 1611 and the PDSCH 1612 via the PUCCH 1621. Here, it is assumed that the PUCCH 1621 is correctly detected in the base station apparatus 3. In the DCI format included in the PDCCH 1603 used for scheduling of the PDSCH 1613, 1 is indicated as the NFI bit corresponding to the PDSCH group (g+1) mod 2, 1 is indicated as the counter DAI, and 1 is indicated as the total DAI. In other words, the NFI bit corresponding to the PDSCH group (g+1) mod 2 is toggled. In the DCI format included in the PDCCH 1604 used for scheduling of the PDSCH 1614, 1 is indicated as the NFI bit corresponding to the PDSCH group (g+1) mod 2, 2 is indicated as the counter DAI, and 2 is indicated as the total DAI. In the DCI format included in the PDCCH 1605 used for scheduling of the PDSCH 1615, 0 is indicated as the NFI bit corresponding to the PDSCH group g, 1 is indicated as the counter DAI, and 1 is indicated as the total DAI. In the DCI format included in the PDCCH 1605, 1 is indicated as the NFI bit (for example, $h^{(g+1)mod\ 2}(g)$) corresponding to another group (for example, the PDSCH group (g+1) mod 2), and 4 is indicated as the total DAI (for example, $V_{DAI}^{(g+1)mod\ 2}$) corresponding to another group (for example, the PDSCH group (g+1) mod 2). The terminal apparatus 1 may generate first HARQ-ACK information for the PDSCH group g (for example, the PDSCH 1615). Here, it is assumed that the terminal apparatus 1 detects the PDCCH 1605. The terminal apparatus 1 may generate second HARQ-ACK information for the PDSCH group (g+1) mod 2) (for example, the PDSCH 1611 to the PDSCH 1614). The terminal apparatus 1 may report the HARQ-ACK information including the first HARQ-ACK information and/or the second HARQ-ACK information via the PDCCH 1622.

In FIG. 16, the PUCCH 1622 may be i (g). $h^{(g+1)mod\ 2}(g)$ may be indicated by the PDCCH 1615, and be a second NFI bit corresponding to the PDSCH group (g+1) mod 2. h ((g+1) mod 2) may be the first NFI bit corresponding to the PDSCH group (g+1) mod 2. h ((g+1) mod 2) may be indicated by the last detected PDCCH among the PDCCH 1601 to the PDCCH 1604. For example, in a case that it is assumed that the PDCCH 1603 and the PDCCH 1604 are not detected, h ((g+1) mod 2) may be indicated by the PDCCH 1602.

In FIG. 16, in a case that $h^{(g+1)mod\ 2}(g)$ is not null (the DCI format indicating $h^{(g+1)mod\ 2}(g)$ is detected), and $h^{(g+1)mod\ 2}(g)$ and h ((g+1) mod 2) are different from each other, the terminal apparatus 1 may generate the second HARQ-ACK information, based at least on $V_{DAI}^{(g+1)mod\ 2}$. For example, the terminal apparatus 1 may generate a NACK of $V_{DAI}^{(g+1)mod\ 2}$ bits as the second HARQ-ACK information. In other words, the second HARQ-ACK information may have a configuration of a NACK of $V_{DAI}^{(g+1)mod\ 2}$ bits. For example, the terminal apparatus 1 may generate a NACK of 1 bit as the second HARQ-ACK information. In a case that $h^{(g+1)mod\ 2}(g)$ is null (the DCI format indicating $h^{(g+1)mod\ 2}(g)$ is not detected), or $h^{(g+1)mod\ 2}(g)$ is equal to h ((g+1) mod 2), the terminal apparatus 1, the set of monitoring occasions for the PDCCH corresponding to the PDSCH group (g+1) mod 2. The base station apparatus 3 may expect the second HARQ-ACK information of a NACK of $V_{DAI}^{(g+1)mod\ 2}$ bits. The base station apparatus 3 may expect the second HARQ-ACK information of a NACK of 1 bit. Owing to the generation method of the second HARQ-ACK information described above, the HARQ-ACK bit can be suitably generated.

In FIG. 16, the terminal apparatus 1 may generate the second HARQ-ACK information through the procedure illustrated in FIG. 12, FIG. 13, and FIG. 14, based at least on $V_{DAI}^{(g+1)mod\ 2}$. For example, in a case $h^{(g+1)mod\ 2}(g)$) is not null (the DCI format indicating $h^{(g+1)mod\ 2}(g)$ is detected), and $h^{(g+1)mod\ 2}(g)$ are h((g+1) mod 2) different from each other, the terminal apparatus 1 may generate the second HARQ-ACK information through the procedure illustrated in FIG. 12, FIG. 13, and FIG. 14, based at least on $V_{DAI}^{(g+1)mod\ 2}$. For example, the terminal apparatus 1 may set $V_{temp2}$ to $V_{DAI}^{(g+1)mod\ 2}$. For example, the terminal apparatus 1 may assume a null set of monitoring occasions for the PDCCH (empty PDCCH monitoring occasion set). In other words, the terminal apparatus 1 may assume the set of monitoring occasions for the PDCCH including zero monitoring occasions for the PDCCH. In other words, the terminal apparatus 1 may assume the set of monitoring occasions for the PDCCH not including the monitoring occasions for the PDCCH. In other words, the terminal apparatus 1 may input the null set of monitoring occasions for the PDCCH to the procedure illustrated in FIG. 12, FIG. 13, and FIG. 14, and generate the second HARQ-ACK information. For example, in the procedure illustrated in FIG. 12, FIG. 13, and FIG. 14, M may be set to 0. For example, in step A7, M may be set to 0. The base station apparatus 3 may expect the second HARQ-ACK information of a NACK of $V_{DAI}^{(g+1)mod\ 2}$ bits. The base station apparatus 3 may expect the second HARQ-ACK information of a NACK of 1 bit. Owing to the generation method of the second HARQ-ACK information described above, the HARQ-ACK bit can be suitably generated.

In FIG. 16, the terminal apparatus 1 may generate the second HARQ-ACK information through a part of the procedure illustrated in FIG. 12, FIG. 13, and FIG. 14, based at least on $V_{DAI}^{(g+1)mod\ 2}$. For example, in a case that $h^{(g+1)mod\ 2}(g)$ is not null (the DCI format indicating $h^{(g+1)mod\ 2}(g)$ is detected), and $h^{(g+1)mod\ 2}(g)$ and $h\ ((g+1)\ mod\ 2)$ are different from each other, the terminal apparatus 1 may set one or multiple variables to a prescribed value, and generate the second HARQ-ACK information in the procedure illustrated in FIG. 12, FIG. 13, and FIG. 14, based at least on $V_{DAI}^{(g+1)mod\ 2}$. For example, $V_{temp2}$ may be set to $V_{DAI}^{(g+1)mod\ 2}$, and through a part of the procedure illustrated in FIG. 12, FIG. 13, and FIG. 14, the second HARQ-ACK information may be generated. The base station apparatus 3 may expect the second HARQ-ACK information of a NACK of $V_{DAI}^{(g+1)mod\ 2}$ bits. The base station apparatus 3 may expect the second HARQ-ACK information of a NACK of 1 bit. Owing to the generation method of the second HARQ-ACK information described above, the HARQ-ACK bit can be suitably generated.

According to an aspect of the present invention, efficient communication can be implemented. According to an aspect of the present invention, efficient transmission and/or reception of the HARQ-ACK information can be implemented. According to an aspect of the present invention, efficient transmission and/or reception of the HARQ-ACK codebook can be implemented.

Various aspects of apparatuses according to an aspect of the present embodiment will be described below.

(1) In order to accomplish the object described above, the present invention is contrived to provide the following means. Specifically, a first aspect of the present invention is a terminal apparatus including: a reception unit configured to receive a PDCCH used for scheduling of a PDSCH group g; and a transmission unit configure to transmit a PUCCH, wherein the PDCCH indicates a total DAI corresponding to a PDSCH group (g+1) mod 2, a value of the total DAI is $V_{DAI}^{(g+1)mod\ 2}$, and in a case that an NFI corresponding to the PDSCH group (g+1) mod 2 is toggled, HARQ-ACK information is generated based at least on $V_{DAI}^{(g+1)mod\ 2}$ regardless of a set of monitoring occasions for the PDCCH corresponding to the PDSCH group (g+1) mod 2, and in a case that the NFI corresponding to the PDSCH group (g+1) mod 2 is not toggled, the HARQ-ACK information is generated based at least on the set of monitoring occasions for the PDCCH corresponding to the PDSCH group (g+1) mod 2, and the HARQ-ACK information is reported via the PUCCH.

(2) In the first aspect of the present invention, in a case that the NFI corresponding to the PDSCH group (g+1) mod 2 is toggled, the HARQ-ACK information of $V_{DAI}^{(g+1)mod\ 2}$ bits are generated, and the $V_{DAI}^{(g+1)mod\ 2}$ bits are set to a NACK.

(3) In the first aspect of the present invention, in a case that the NFI corresponding to the PDSCH group (g+1) mod 2 is toggled, the HARQ-ACK information of a NACK of 1 bit is generated.

(4) A second aspect of the present invention is a terminal apparatus including: a reception unit configured to receive a PDCCH used for scheduling of a PDSCH group g; and a transmission unit configure to transmit a PUCCH, wherein the PDCCH indicates a total DAI corresponding to a PDSCH group (g+1) mod 2, a value of the total DAI is $V_{DAI}^{(g+1)mod\ 2}$, and in a procedure of generating HARQ-ACK information on an assumption that a set of monitoring occasions for the PDCCH corresponding to the PDSCH group (g+1) mod 2 is null, or on an assumption that the PDCCH used for scheduling of the PDSCH group (g+1) mod 2 is not detected, $V_{temp2}$ used for determination of number of bits of the HARQ-ACK information is set to $V_{DAI}^{(g+1)mod\ 2}$, the HARQ-ACK information is generated, and the HARQ-ACK information is reported via the PUCCH.

(5) A third aspect of the present invention is a base station apparatus including: a transmission unit configured to transmit a PDCCH used for scheduling of a PDSCH group g; and a reception unit configured to receive a PUCCH, wherein the PDCCH indicates a total DAI corresponding to a PDSCH group (g+1) mod 2, a value of the total DAI is $V_{DAI}^{(g+1)mod\ 2}$, and in a case that an NFI corresponding to the PDSCH group (g+1) mod 2 is toggled, HARQ-ACK information is generated based at least on $V_{DAI}^{(g+1)mod\ 2}$, regardless of a set of monitoring occasions for the PDCCH corresponding to the PDSCH group (g+1) mod 2, and in a case that the NFI corresponding to the PDSCH group (g+1) mod 2 is not toggled, the HARQ-ACK information is generated based at least on the set of monitoring occasions for the PDCCH corresponding to the PDSCH group (g+1) mod 2, and the HARQ-ACK information is reported via the PUCCH.

(2) In the third aspect of the present invention, in a case that the NFI corresponding to the PDSCH group (g+1) mod 2 is toggled, the HARQ-ACK information of $V_{DAI}^{(g+1)mod\ 2}$ bits are generated, and the $V_{DAI}^{(g+1)mod\ 2}$ bits are set to a NACK.

(3) In the third aspect of the present invention, in a case that the NFI corresponding to the PDSCH group (g+1) mod 2 is toggled, the HARQ-ACK information of a NACK of 1 bit is generated.

(8) A fourth aspect of the present invention is a base station apparatus including: a transmission unit configured to transmit a PDCCH used for scheduling of a PDSCH group g; and a reception unit configured to receive a PUCCH, wherein the PDCCH indicates a total DAI corresponding to a PDSCH group (g+1) mod 2, a value of the total DAI is $V_{DAI}^{(g+1)mod\ 2}$, and in a procedure of generating HARQ-ACK information on an assumption that a set of monitoring occasions for the PDCCH corresponding to the PDSCH group (g+1) mod 2 is null, or on an assumption that the PDCCH used for scheduling of the PDSCH group (g+1) mod 2 is not detected, $V_{temp2}$ used for determination of number of bits of the HARQ-ACK information is set to $V_{DAI}^{(g+1)mod\ 2}$, the HARQ-ACK information is generated, and the HARQ-ACK information is reported via the PUCCH.

According to the above-described embodiment related to an aspect of the present invention, transmission and/or reception of the HARQ-ACK information between the terminal apparatus 1 and the base station apparatus 3 can be appropriately implemented.

A program running on the base station apparatus 3 and the terminal apparatus 1 according to one aspect of the present invention may be a program (program that causes a computer to function) that controls a Central Processing Unit (CPU) and the like, such that the program realizes the functions of the above-described embodiment according to one aspect of the present invention. Also, the information handled in these apparatuses is temporarily loaded into a Random Access Memory (RAM) while being processed, is then stored in a Hard Disk Drive (HDD) and various types of Read Only Memory (ROM) such as a Flash ROM, and is read, modified, and written by the CPU, as necessary.

Note that the terminal apparatus 1 and the base station apparatus 3 according to the aforementioned embodiment may be partially implemented by a computer. In such a case, a program for implementing such control functions may be recorded on a computer-readable recording medium to cause a computer system to read and execute the program recorded on this recording medium.

Note that it is assumed that the "computer system" mentioned here refers to a computer system built into the terminal apparatus 1 or the base station apparatus 3, and the computer system includes an OS and hardware components such as a peripheral device. Furthermore, a "computer-readable recording medium" refers to a portable medium such as a flexible disk, a magneto-optical disk, a ROM, a CD-ROM, and the like, and a storage device such as a hard disk built into the computer system.

Moreover, the "computer-readable recording medium" may include a medium that dynamically retains the program for a short period of time, such as a communication wire that is used to transmit the program over a network such as the Internet or over a communication line such as a telephone line, and a medium that retains the program for a certain period of time, such as a volatile memory within the computer system which functions as a server or a client in a case that the program is transmitted via the communication wire. Furthermore, the aforementioned program may be configured to implement part of the functions described above, and also may be configured to be capable of implementing the functions described above in combination with a program already recorded in the computer system.

The terminal apparatus 1 may include at least one processor, and at least one memory including a computer program instruction (computer program). The memory and the computer program instruction (computer program) may adopt a configuration of causing the terminal apparatus 1 to perform the operation and the processing described in the above embodiment by using a processor. The base station apparatus 3 may include at least one processor, and at least one memory including a computer program instruction (computer program). The memory and the computer program instruction (computer program) may adopt a configuration of causing the base station apparatus 3 to perform the operation and the processing described in the above embodiment by using a processor.

Furthermore, the base station apparatus 3 according to the aforementioned embodiment may be achieved as an aggregation (apparatus group) including multiple apparatuses. Each of the apparatuses included in such an apparatus group may include each function, or some or all portions of each functional block of the base station apparatus 3 according to the aforementioned embodiment. As the apparatus group, it is only necessary to have a complete set of functions or functional blocks of the base station apparatus 3. Moreover, the terminal apparatus 1 according to the aforementioned embodiment can also communicate with the base station apparatus as the aggregation.

Also, the base station apparatus 3 according to the aforementioned embodiment may be an Evolved Universal Terrestrial Radio Access Network (EUTRAN) and/or a Next-Gen RAN (NG-RAN or NR RAN). Moreover, the base station apparatus 3 according to the aforementioned embodiment may have some or all of the functions of a higher node for an eNodeB and/or a gNB.

Also, some or all portions of each of the terminal apparatus 1 and the base station apparatus 3 according to the aforementioned embodiment may be implemented as an LSI which is a typical integrated circuit or may be implemented as a chip set. The functional blocks of each of the terminal apparatus 1 and the base station apparatus 3 may be individually implemented as a chip, or some or all of the functional blocks may be integrated into a chip. A circuit integration technique is not limited to the LSI, and may be implemented with a dedicated circuit or a general-purpose processor. Moreover, in a case that with advances in semiconductor technology, a circuit integration technology with which an LSI is replaced appears, it is also possible to use an integrated circuit based on the technology.

In addition, although the aforementioned embodiments have described the terminal apparatus as an example of a communication apparatus, the present invention is not limited to such a terminal apparatus, and is applicable to a terminal apparatus or a communication apparatus that is a stationary type or a non-movable type electronic apparatus installed indoors or outdoors, for example, such as an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which elements described in the respective embodiments and having mutually the same effects, are substituted for one another is also included.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
10, 30 Radio transmission and/or reception unit
11, 31 Antenna unit
12, 32 RF unit
13, 33 Baseband unit
14, 34 Higher layer processing unit
15, 35 Medium access control layer processing unit
16, 36 Radio resource control layer processing unit
91, 92, 93, 94 Search space set
301 Primary cell
302, 303 Secondary cell
801, 802, 803, 804, 805, 806 Monitoring occasion for search space set
811, 812, 813, 814 DCI format
1101, 1102, 1103, 1104, 1105 PDCCH
1111, 1112, 1113, 1114, 1115 PDSCH
1121, 1122, 1123 PUCCH

The invention claimed is:
1. A terminal apparatus comprising:
reception circuitry configured to receive indication of a first Physical Downlink Shared Channel (PDSCH) group index in a first downlink control information (DCI) format, and receive indication of a second

PDSCH group index different from the first PDSCH group index in a second DCI format; and transmission circuitry configured to, in a case that the first DCI format is detected, transmit HARQ-ACK information of the second PDSCH group index, the HARQ-ACK information being determined based at least on a parameter M being set to a number of monitoring occasions for a Physical Downlink Control Channel (PDCCH), wherein a value of a first New Feedback Indicator (NFI) of the second PDSCH group index is indicated by a first NFI field in the second DCI format, a value of a second NFI of the second PDSCH group index is indicated by a second NFI field in the first DCI format, the second NFI field being different from the first NFI field, and in a case that the value of the second NFI is not null and the value of the second NFI is different from the value of the first NFI, a value of the parameter M is set to zero.

2. A base station apparatus comprising:

transmission circuitry configured to indicate a first Physical Downlink Shared Channel (PDSCH) group index in a first downlink control information (DCI) format, and indicate a second PDSCH group index different from the first PDSCH group index in a second DCI format; and reception circuitry configured to, in a case that the first DCI format is transmitted, receive HARQ-ACK information of the second PDSCH group index, the HARQ-ACK information being determined based at least on a parameter M being set to a number of monitoring occasions for a Physical Downlink Control Channel (PDCCH), wherein a value of a first New Feedback Indicator (NFI) of the second PDSCH group index is indicated by a first NFI field in the second DCI format, a value of a second NFI of the second PDSCH group index is indicated by a second NFI field in the first DCI format, the second NFI field being different from the first NFI field, and in a case that the value of the second NFI is not null and the value of the second NFI is different from the value of the first NFI, a value of the parameter M is set to zero.

3. A communication method for a terminal apparatus, comprising the steps of:

receiving indication of a first Physical Downlink Shared Channel (PDSCH) group index in a first downlink control information (DCI) format;

receiving indication of a second PDSCH group index different from the first PDSCH group index in a second DCI format; and in a case that the first DCI format is detected, transmitting HARQ-ACK information of the second PDSCH group index, the HARQ-ACK information being determined based at least on a parameter M being set to a number of monitoring occasions for a Physical Downlink Control Channel (PDCCH), wherein a value of a first New Feedback Indicator (NFI) of the second PDSCH group index is indicated by a first NFI field in the second DCI format, a value of a second NFI of the second PDSCH group index is indicated by a second NFI field in the first DCI format, the second NFI field being different from the first NFI field, and in a case that the value of the second NFI is not null and the value of the second NFI is different from the value of the first NFI, a value of the parameter M is set to zero.

* * * * *